US012177535B2

(12) United States Patent
Nelson et al.

(10) Patent No.: US 12,177,535 B2
(45) **Date of Patent: *Dec. 24, 2024**

(54) METHODS AND APPARATUS TO GENERATE A SIGNATURE BASED ON SIGNATURE CANDIDATES

(71) Applicant: The Nielsen Company (US), LLC, New York, NY (US)

(72) Inventors: Daniel Nelson, Tampa, FL (US); David H. Wright, Safety Harbor, FL (US); Raghuram Ranganathan, Tampa, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/463,623

(22) Filed: Sep. 8, 2023

(65) Prior Publication Data

US 2023/0421864 A1 Dec. 28, 2023

Related U.S. Application Data

(63) Continuation of application No. 17/959,043, filed on Oct. 3, 2022, now Pat. No. 11,785,316, which is a (Continued)

(51) Int. Cl.
*H04N 21/8352* (2011.01)
*H04N 21/854* (2011.01)

(52) U.S. Cl.
CPC ....... *H04N 21/8352* (2013.01); *H04N 21/854* (2013.01)

(58) Field of Classification Search
CPC ......................... H04N 21/8352; H04N 21/854
See application file for complete search history.

(56) References Cited

U.S. PATENT DOCUMENTS 4,677,466 A 6/1987 Lert, Jr. et al.
5,481,294 A 1/1996 Thomas et al.

(Continued)

OTHER PUBLICATIONS

United States Patent and Trademark Office, "Non-Final Office Action," in connection with U.S. Appl. No. 17/515,152, mailed on Nov. 20, 2023, 10 pages.

(Continued)

*Primary Examiner* — Mulugeta Mengesha

(57) ABSTRACT

Methods, apparatus, systems and articles of manufacture are disclosed to generate a signature based on signature candidates. An example apparatus disclosed herein includes first means for determining an alignment point of a first candidate signature segment and a second candidate signature segment, the first candidate signature segment and the second candidate signature segment include time data and signature data, the alignment point based on the time data of the first candidate signature segment and the time data of the second candidate signature segment, means for comparing a first signature to a second signature at the alignment point, the first signature representative of media included in the first candidate signature segment, the second signature included in the second candidate signature segment, and means for stitching the second signature to the first signature based on the comparison to generate a stitched signature, the stitched signature to be used for media crediting.

20 Claims, 13 Drawing Sheets

Related U.S. Application Data continuation of application No. 17/331,603, filed on May 26, 2021, now Pat. No. 11,463,787.

(56) References Cited

U.S. PATENT DOCUMENTS

| | | | | |
|---|---|---|---|---|
| 7,460,684 | B2 | 12/2008 | Srinivasan | |
| 9,438,940 | B2 | 9/2016 | Nelson | |
| 9,548,830 | B2 | 1/2017 | Kariyappa et al. | |
| 9,668,020 | B2 | 5/2017 | Nelson et al. | |
| 10,200,546 | B2 | 2/2019 | Nelson et al. | |
| 2005/0232411 | A1 | 10/2005 | Srinivasan et al. | |
| 2006/0153296 | A1 | 7/2006 | Deng | |
| 2006/0184961 | A1 | 8/2006 | Lee et al. | |
| 2006/0195861 | A1 | 8/2006 | Lee | |
| 2007/0274537 | A1 | 11/2007 | Srinivasan | |
| 2008/0091288 | A1 | 4/2008 | Srinivasan | |
| 2008/0276265 | A1 | 11/2008 | Topchy et al. | |
| 2010/0131970 | A1* | 5/2010 | Falcon | H04H 60/56 725/19 |
| 2012/0117584 | A1* | 5/2012 | Gordon | H04N 21/8358 725/19 |
| 2013/0160042 | A1* | 6/2013 | Stokes | H04N 21/42203 725/18 |
| 2015/0363420 | A1 | 12/2015 | Garland et al. | |
| 2016/0055606 | A1* | 2/2016 | Petrovic | G06V 20/46 382/100 |
| 2016/0328398 | A1 | 11/2016 | Adams et al. | |
| 2017/0245009 | A1* | 8/2017 | Nielsen | H04N 21/4394 |
| 2018/0005038 | A1 | 1/2018 | Granström | |
| 2019/0037257 | A1 | 1/2019 | Nelson et al. | |
| 2019/0079961 | A1 | 3/2019 | Chen | |
| 2020/0145721 | A1 | 5/2020 | Tapse et al. | |

OTHER PUBLICATIONS

United States Patent and Trademark Office, “Final Office Action,” in connection with U.S. Appl. No. 17/515,152, mailed on May 3, 2024, 7 pages.

* cited by examiner

| REFERENCE | | | STITCHED | |
|---|---|---|---|---|
| 14 | (42) | - - - - - - - - - - - - - | 4 | (42) |
| 15 | 47 | - - - - - - - - - - - - - | 4 | 46 |
| 15 | 26 | - - - - - - - - - - - - - | 5 | 28 |
| 16 | 22 | - - - - - - - - - - - - - | 5 | 21 |
| 16 | 29 | - - - - - - - - - - - - - | 5 | 29 |
| 17 | 17 | - - - - - - - - - - - - - | 6 | 16 |
| 17 | 22 | - - - - - - - - - - - - - | 6 | 23 |
| 17 | 28 | - - - - - - - - - - - - - | 7 | 28 |
| 18 | 41 | - - - - - - - - - - - - - | 7 | 41 |
| 19 | 49 | - - - - - - - - - - - - - | 8 | 48 |
| 20 | 61 | - - - - - - - - - - - - - | 9 | 61 |
| 20 | 16 | - - - - - - - - - - - - - | 9 | 14 |
| 21 | 68 | - - - - - - - - - - - - - | 10 | 70 |
| 21 | 19 | - - - - - - - - - - - - - | 10 | 19 |
| 22 | 44 | - - - - - - - - - - - - - | 11 | 43 |
| 22 | 26 | - - - - - - - - - - - - - | 12 | 26 |
| 23 | 26 | - - - - - - - - - - - - - | 12 | 26 |
| 23 | 6 | - - - - - - - - - - - - - | 12 | 7 |
| 23 | 24 | - - - - - - - - - - - - - | 12 | 23 |
| 24 | 35 | - - - - - - - - - - - - - | 13 | 36 |
| 24 | 26 | - - - - - - - - - - - - - | 13 | 26 |
| 25 | 25 | - - - - - - - - - - - - - | 14 | 6 |
| 25 | 31 | - - - - - - - - - - - - - | 14 | 49 |
| 26 | 32 | - - - - - - - - - - - - - | 15 | 32 |
| 26 | 14 | - - - - - - - - - - - - - | 15 | 15 |
| 26 | 39 | - - - - - - - - - - - - - | 16 | 38 |
| 27 | 20 | - - - - - - - - - - - - - | 16 | 21 |
| 27 | 33 | - - - - - - - - - - - - - | 16 | 33 |
| 28 | 21 | - - - - - - - - - - - - - | 17 | 20 |
| 28 | (29) | - - - - - - - - - - - - - | 17 | (30) |

| REFERENCE | | | CANDIDATE | |
|---|---|---|---|---|
| 14 | 42 | | 4 | 42 |
| 15 | 47 | | 4 | 46 |
| 15 | 26 | | 5 | 28 |
| 16 | 22 | | 5 | 21 |
| 16 | 29 | | 5 | 29 |
| 17 | 17 | | 6 | 16 |
| 17 | 22 | | 6 | 23 |
| 17 | 28 | | 7 | 28 |
| 18 | 41 | | 7 | 41 |
| 19 | 49 | | 8 | 48 |
| 20 | 61 | | 9 | 61 |
| 20 | 16 | | 9 | 19 |
| 21 | 68 | | 11 | 43 |
| 21 | 19 | | 12 | 26 |
| 22 | 44 | | 12 | 26 |
| 22 | 26 | | 12 | 7 |
| 23 | 26 | | 12 | 23 |
| 23 | 6 | | 13 | 36 |
| 23 | 24 | | 13 | 26 |
| 24 | 35 | | 14 | 6 |
| 24 | 26 | | 14 | 49 |
| 25 | 25 | | 15 | 32 |
| 25 | 31 | | 15 | 15 |
| 26 | 32 | | 16 | 38 |
| 26 | 14 | | 16 | 21 |
| 26 | 39 | | 16 | 33 |
| 27 | 20 | | 17 | 20 |
| 27 | 33 | | 17 | 30 |
| 28 | 21 | | | |
| 28 | 29 | | | |

METHODS AND APPARATUS TO GENERATE A SIGNATURE BASED ON SIGNATURE CANDIDATES

CROSS REFERENCE TO RELATED APPLICATIONS

This disclosure is a continuation of U.S. patent application Ser. No. 17/959,043, filed on Oct. 3, 2022, now issued as U.S. Pat. No. 11,785,316, which is a continuation of U.S. patent application Ser. No. 17/331,603, filed on May 26, 2021, now issued as U.S. Pat. No. 11,463,787, each of which is hereby incorporated herein by reference in its entirety. Priority to U.S. patent application Ser. Nos. 17/959,043 U.S. patent application Ser. No. 17/331,603 is hereby claimed.

FIELD OF THE DISCLOSURE

This disclosure relates generally to media monitoring, and, more particularly, to methods and apparatus to generate a signature based on signature candidates.

BACKGROUND

A media monitoring entity can generate audio signatures from a media signal. Audio signatures are a condensed reference that can be used to subsequently identify the media. These signatures can be hashed to allow faster matching in an audio signature database. In some examples, a media monitoring entity can monitor a media source feed (e.g., a television feed, etc.) to generate reference signatures representative of media presented via that media source feed. Such reference signatures can be compared to signatures generated by media monitors to credit viewership of the media.

BRIEF DESCRIPTION OF THE DRAWINGS

The figures are not to scale. In general, the same reference numbers will be used throughout the drawing(s) and accompanying written description to refer to the same or like parts.

Figure 1:
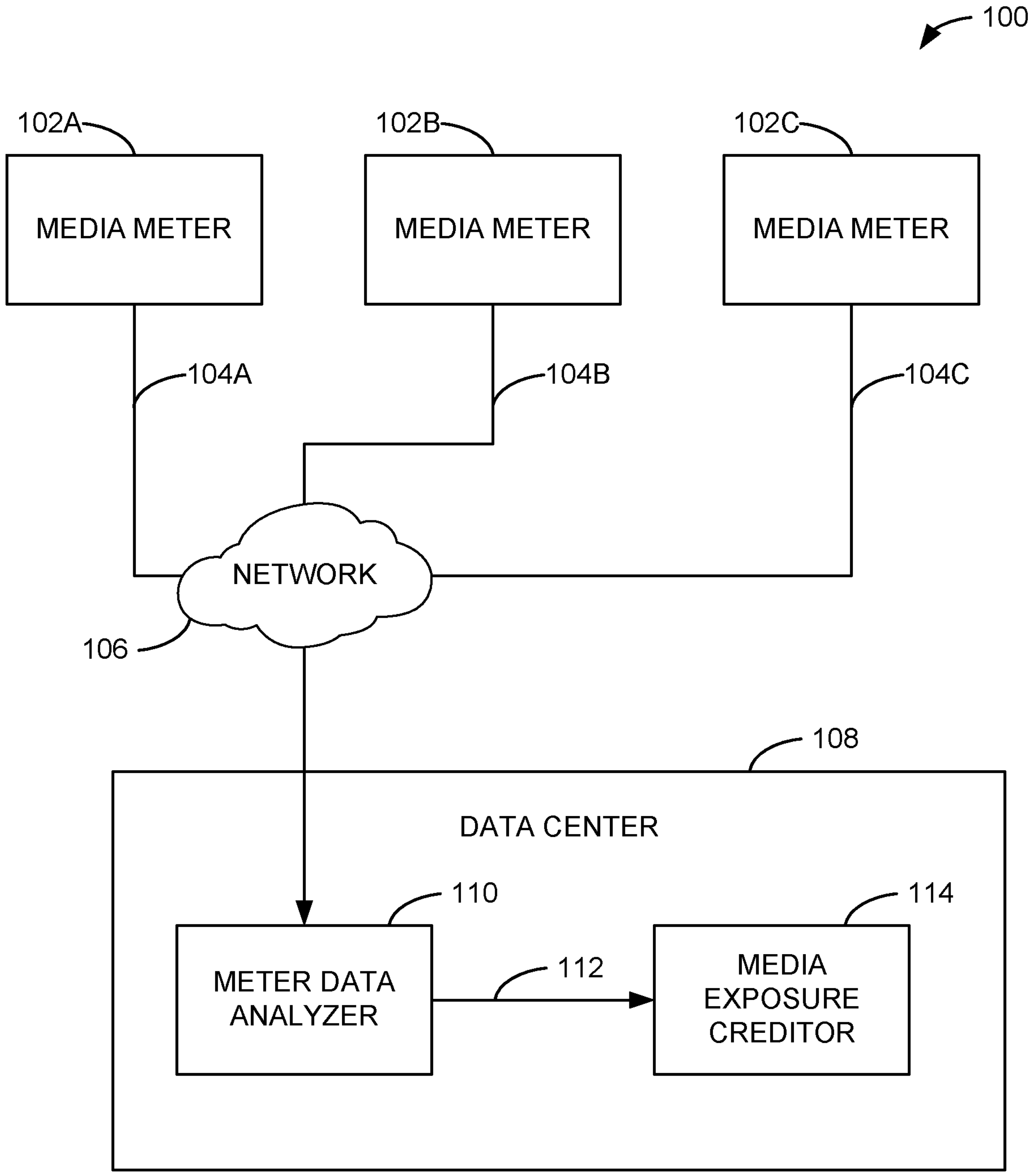
FIG. 1 is a schematic illustration of an example media monitoring system constructed in accordance with teachings of this disclosure to monitor media.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions (e.g., smart televisions), televisions with an Internet enablement attached (e.g., a television with a Roku®), personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), identifying information (e.g., demographic information, a user identifier, a panelist identifier, a username, etc.), etc.

Audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the watermark is embedded in the audio or video component so that the watermark is hidden. This embedding may be carried out utilizing psychoacoustic masking.

As used herein, the terms “code” or “watermark” are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

To identify watermarked media, the watermark(s) are extracted and used to access a table of reference watermarks that are mapped to media identifying information. In some examples, media monitoring companies provide watermarks and/or watermarking devices to media providers with which to encode their media source feeds. In some examples, if a media provider provides multiple media source feeds (e.g., ESPN and ESPN 2, etc.), a media provider can provide a different watermark for each media source feed. In some examples, a media provider could encode a media source feed with an incorrect watermark (e.g., a watermark meant for ESPN could accidentally be encoded on ESPN2, etc.). In this example, crediting using only watermarking could result in the wrong media source feed being credited.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms “fingerprint” and “signature” are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signatures is found, the monitored media can be identified as corresponding to the particular reference media represented by the reference signature that matched the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature, these attributes may then be associated with the monitored media whose monitored signature(s) matched the reference signature(s). Example systems for identifying media based on codes and/or signatures are long known and were first disclosed in Thomas, U.S. Pat. No. 5,481,294, which is hereby incorporated by reference in its entirety.

Media monitoring entities (e.g., The Nielsen Company (US), LLC, etc.) desire knowledge regarding how users interact with media devices such as smartphones, tablets, laptops, smart televisions, etc. In particular, media monitoring entities want to monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitoring data based on the media exposure of those users. Such media meters can be associated with a specific media device (e.g., a television, a mobile phone, a computer, etc.) and/or a specific person (e.g., a portable meter, etc.).

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and determining signatures associated with the media source feed.

In some examples, media monitoring entities store generated reference databases and gathered monitoring data on cloud storage services (e.g., AMAZON WEB SERVICES®, etc.). To allow the crediting of time-shifted viewing (e.g., viewing media via a digital video recorder (DVR), etc.), the stored references are retained for a period time after the initial presentation of the media.

In some examples, the media monitoring entity can hash the determined signatures. Additionally or alternatively, the media monitoring entities generate reference signatures for downloaded reference media (e.g., from a streaming media provider), reference media transmitted to the media monitoring entity from one or more media providers, etc. That is, the media monitoring entities can generate reference signatures of media that is not live broadcasted. In some examples, media that is not live broadcasted includes a subscription video on demand (SVOD) asset. As used herein, a “media asset” refers to any individual, collection, or portion/piece of media of interest (e.g., a commercial, a song, a movie, an episode of television show, etc.). Media assets can be identified via unique media identifiers (e.g., a name of the media asset, a metadata tag, etc.). Media assets can be presented by any type of media presentation method (e.g., via streaming, via live broadcast, from a physical medium, etc.).

The reference database can be compared (e.g., matched, etc.) to media monitoring data (e.g., watermarks, unhashed signatures, hashed signatures, etc.) gathered by media meter(s) to allow crediting of media exposure. Monitored media can be credited using one, or a combination, of watermarks, unhashed signatures, and hashed signatures. Reference signatures of the reference database are ideally generated using a complete and uninterrupted (e.g., continuous) viewing of the media asset. However, waiting to receive a single, complete media asset can take time, which is a limited commodity when generating a reference signature for release day measurement, for example. If a media asset is not in the reference database (e.g., a new episode in a series that does not yet have corresponding reference signatures stored in the reference database), the media monitoring entity may be unable to credit the media exposure of the media asset.

However, media monitoring entities receive partial segments or fragments of an episode a panelist is watching. As used herein, a signature segment or signature fragment is a signature sequence of a media asset that does not correspond to the entire duration of the media asset. Thus, two or more signature segments of a media asset can be stitched together to form a signature sequence corresponding to the entire duration of the media asset. In prior techniques, signature segments are stitched together based on time of content data. For example, adjacent signature segments are determined according to time of content data and stitched together. However, time of content data can be unreliable and/or inconsistent (e.g., different signature segments correspond to different clock specificity, etc.). If each signature segment corresponds to different time of content data, prior signature stitching techniques may incorrectly align and/or arrange signature segments such that the resulting signature sequence is not representative of the signature sequence that was generated from an uninterrupted viewing (e.g., the corresponding reference signature). In such examples, the resulting stitched signature may have additional signatures and/or fewer signatures than the reference signature. Furthermore, these stitching errors may accumulate each time signature segments are stitched together, resulting in a stitched signature sequence that does not match the reference signature and, thus, may not be recognized for media crediting. To increase accuracy of signature segment stitching, methods, apparatus, and systems disclosed herein stitch signature segments based on an overlap between signature segments, instead of aligning signature segments based on time of content, thereby reducing incorrect stitched signature sequences.

Methods and apparatus disclosed herein enable crediting media based on signature segments of media assets. Example techniques disclosed herein include determining whether signature segments meet a duration threshold, the duration threshold to determine whether the signature segments are candidate signature segments for stitching. Disclosed example techniques also include determining an overlap between the candidate signature segments based on time data, the overlap to represent similar time data shared between the candidate signature segments. Disclosed example techniques further include stitching candidate signature sequences together to generate stitched signatures, in response to determining (i) the number of strong matches between the signature sequences of the overlap exceeds a first threshold and (ii) the number of basic matches between the signature sequences of the overlap exceeds a second threshold. As used herein, "stitched signatures" are signature sequences of corresponding to the combination of two or more candidate signature segments. Disclosed example techniques also include comparing stitched signatures to reference signatures to validate the stitched signatures.

FIG. 1 is a schematic illustration of an example media monitoring system 100 constructed in accordance with teachings of this disclosure to monitor media. The example media monitoring system 100 includes an example first media meter 102A, an example second media meter 102B, and an example third media meter 102C, which output example first monitoring data 104A, example second monitoring data 104B, and example third monitoring data 104C, respectively, to an example network 106. The media monitoring system 100 further includes an example data center 108, which includes an example meter data analyzer 110. In the illustrated example, the meter data analyzer 110 outputs identification data 112 to an example media exposure creditor 114.

The example media meters 102A, 102B, 102C collect media monitoring information. In some examples, the media meters 102A, 102B, 102C are associated with (e.g., installed on, coupled to, etc.) respective media devices. For example, a media device associated with one of the media meters 102A, 102B, 102C presents media (e.g., via a display, etc.). In some examples, the media device associated with one of the media meters 102A, 102B, 102C additionally or alternatively presents the media on separate media presentation equipment (e.g., speakers, a display, etc.). For example, the media device(s) associated with the media meters 102A, 102B, 102C can include a personal computer, an Internet-enabled mobile handsets (e.g., a smartphone, an iPod®, etc.), video game consoles (e.g., Xbox®, Play Station 3, etc.), tablet computers (e.g., an iPad®, a Motorola™ Xoom™, etc.), digital media players (e.g., a Roku® media player, a Slingbox®, a Tivo®, etc.), televisions, desktop computers, laptop computers, servers, etc. In such examples, the media meters 102A, 102B, 102C may have direct connections (e.g., physical connections) to the devices to be monitored, and/or may be connected wirelessly (e.g., via Wi-Fi, via Bluetooth, etc.) to the devices to be monitored.

Additionally or alternatively, in some examples, one or more of the media meters 102A, 102B, 102C are portable meters carried by one or more individual people. In the illustrated example, the media meters 102A, 102B, 102C monitor media presented to one or more people associated with the media meters 102A, 102B, 102C and generate the example monitoring data 104A, 104B, 104C. In some examples, monitoring data 104A, 104B, 104C generated by the media meters 102A, 102B, 102C can include watermarks detected in presented media. Such detected watermarks may be referred to as monitored media watermarks or monitored watermarks as they are detected in media monitored by the media meters 102A, 102B, 102C. In some examples, the media meters 102A, 102B, 102C can determine signatures associated with the presented media (e.g., signature segments, etc.). For example, the media meters 102A, 102B, 102C can determine signatures (e.g., generate signatures, create signatures, etc.) representative of media presented on the associated media devices. Such signatures may be referred to as monitored media signatures or monitored signatures as they are determined from media monitored by the media meters 102A, 102B, 102C. In some examples, the monitoring data 104A, 104B, 104C includes time data. For example, the monitoring data 104A, 104B, 104C can include timestamps associated with each signature of the monitoring data 104A, 104B, 104C. Accordingly, the monitoring data 104A, 104B, 104C can include monitored media signatures and/or monitored media watermarks representative of the media monitored by the media meters 102A, 102B, 102C. In some examples, the monitoring data 104A, 104B, 104C is associated with a discrete, measurement time period (e.g., five minutes, ten minutes, etc.). In such examples, the monitoring data 104A, 104B, 104C can include sequences of monitored media signatures and/or sequences of monitored media watermarks associated with media asset(s) (or portions thereof) presented by the media devices monitored by the media meters 102A, 102B, 102C.

Example signature generation techniques that may be implemented by the media meters 102A, 102B, 102C include, but are not limited to, examples disclosed in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Pat. No. 9,438,940 issued to Nelson on Sep. 6, 2016; U.S. Pat. No. 9,548,830 issued to Kariyappa et al. on Jan. 17, 2017; U.S. Pat. No. 9,668,020 issued to Nelson et al. on May 30, 2017; U.S. Pat. No. 10,200,546 issued to Nelson et al. on Feb. 5, 2019; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008.

The example network 106 is a network used to transmit the monitoring data 104A, 104B, 104C to the data center 108. In some examples, the network 106 can be the Internet or any other suitable external network. In other examples, the network 106 can be a cable broadcast system and the monitoring data 104A, 104B, 104C could be return path data (RPD). In other examples, any other communication path for transmitting the monitoring data 104A, 104B, 104C to the data center 108 can be used (e.g., a wired network, a wireless network, a local area network, a wide area network, etc.).

The example data center 108 is an execution environment used to implement the example meter data analyzer 110 and the example media exposure creditor 114. In some examples, the data center 108 is associated with a media monitoring entity. In some examples, the data center 108 can be a physical processing center (e.g., a central facility of the media monitoring entity, etc.). Additionally or alternatively, the data center 108 can be implemented via a cloud service (e.g., AWS®, etc.). In this example, the data center 108 can further store and process generated watermark and signature reference data.

The example meter data analyzer 110 processes the gathered media monitoring data to detect, identify, credit, etc., respective media assets and/or portions thereof (e.g., media segments) associated with the corresponding monitoring data 104A, 104B, 104C. For example, the meter data analyzer 110 can compare the monitoring data 104A, 104B, 104C to generated reference data to determine what respective media is associated with the corresponding monitoring data 104A, 104B, 104C. The meter data analyzer 110 of the illustrated example also analyzes the monitoring data 104A, 104B, 104C to determine if the media asset(s), and/or particular portion(s) (e.g., segment(s)) thereof, associated with the signature match is (are) to be credited. For example, the meter data analyzer 110 can compare monitored media signatures in the monitoring data 104A, 104B, 104C to a library of generated reference signatures to determine the media asset(s) associated with the monitored media signatures.

In response to not detecting a match between a sequence of the monitored media signatures and a corresponding sequence of the reference signatures, the meter data analyzer 110 can determine whether the sequence of the monitored media signatures meet candidate criteria. For example, the candidate criteria can be a time duration associated with the signature segment. In some examples, if the signature segments meet the candidate criteria, referred to herein as a candidate signature segment, the meter data analyzer 110 performs signature-by-signature matching to determine whether the first candidate signature segment and the second candidate signature segment overlap.

The example meter data analyzer 110 determines if the signature sequences of the overlap between the first and second candidate signature segments meet stitching criteria. For example, stitching criteria can be a number of strong matches, a number of basic matches, etc. In response to the signature sequences of the overlap meeting stitching criteria, the meter data analyzer 110 stitches the first and second candidate signature segments together to generate a stitched signature. In some examples, the meter data analyzer 110 validates the stitched signature. For example, the meter data analyzer 110 performs signature-by-signature matching of the stitched signature and a reference signature (e.g., a signature of the media asset that was generated continuously). An example implementation of the meter data analyzer 110 is described below in conjunction with FIG. 2.

The example identification data 112 includes information to credit user(s) associated with the media meters 102A, 102B, 102C with exposure to one or more particular media assets. For example, the identification data 112 can include direct associations between monitoring data 104A, 104B, 104C and one or more particular media assets. For example, the identification data 112 can include media identifiers associated with the media assets represented in the monitoring data 104A, 104B, 104C and timestamps associated with the period of exposure to that media. The example media exposure creditor 114 uses the identification data 112 to credit media with having been exposed to user(s). In some examples, the media exposure creditor 114 generates a report including data metrics that may be presented to media providers.

Figure 2:
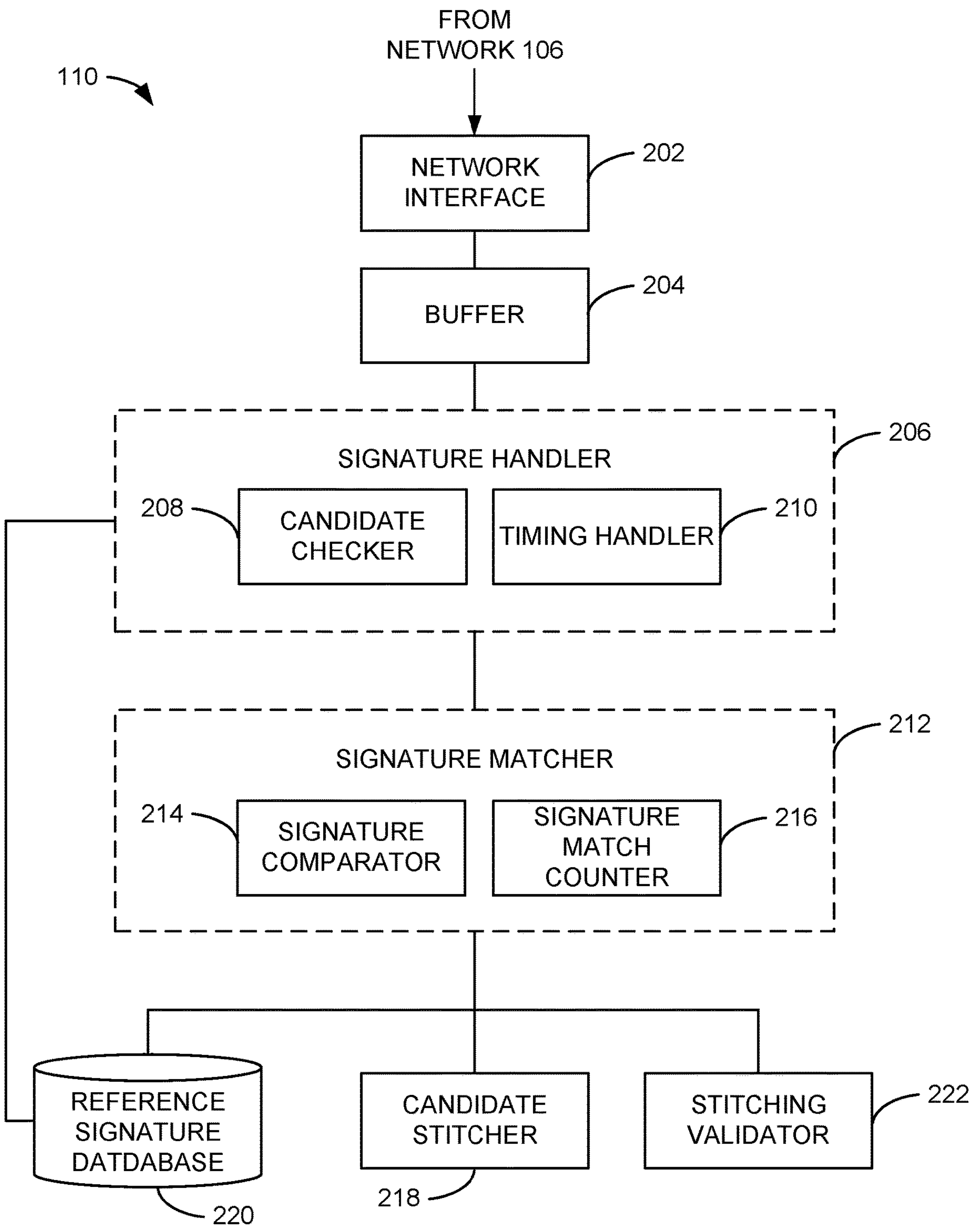
FIG. 2 is a schematic illustration of an example meter data analyzer included in the example media monitoring system of FIG. 1.

FIG. 2 is a schematic illustration of an example implementation of the example meter data analyzer 110 included in the example media monitoring system 100 of FIG. 1. The example meter data analyzer 110 of FIG. 2 includes an example network interface 202, an example buffer 204, an example signature handler 206, an example signature matcher 212, an example candidate stitcher 218, an example reference signature database 220, and an example stitching validator 222.

The example network interface 202 of the illustrated example of FIG. 2 is communicatively connected to the example network 106 of FIG. 1. The example network interface 202 provides connection between the example media meters 102A, 102B, 102C and the example network 106. In some examples, the example network interface 202 is implemented by hardware (e.g., a network interface card). In further examples, the example network interface 202 is implemented by software.

The example buffer 204 of the illustrated example of FIG. 2 stores (e.g., buffers, holds, etc.) incoming signatures. For example, the buffer 204 stores signature segments accessed by the network interface 202. The example buffer 204 may be implemented using any number and/or type(s) of non-volatile, and/or volatile computer-readable storage device(s) and/or storage disk(s).

The example signature handler 206 of the illustrated example of FIG. 2 determines whether signatures stored in the buffer 204 are candidate signature segments. The example signature handler 206 includes an example candidate checker 208 and an example timing handler 210.

The example candidate checker 208 determines whether signature segments stored in the buffer 204 are candidate signature segments. For example, the candidate checker 208 determines whether the signature segments are stored in the reference signature database 220. That is, a signature segment can correspond to the entire duration of a reference signature (e.g., the monitoring data 104A, 104B, 104C was generated based on an uninterrupted viewing of a media asset), a signature segment can match a segment of a reference signature (e.g., the signature segment corresponds to a reference signature already generated, the signature segment corresponds to a stitched signature segment, etc.), etc. Thus, if the signature segment matches signature sequences stored in the reference signature database 220, the signature segment is not a candidate signature segment.

If the example candidate checker 208 determines the signature segment is not stored in the reference signature database 220, the candidate checker 208 determines the time duration of the signature segment. In some examples, the candidate checker 208 determines the time duration of the signature segment based on timestamps associated with the first and last signatures of the signature segment. Thus, the example candidate checker 208 may determine the time duration of the signature segment as the difference between the timestamp of the last signature and the timestamp of the first signature of the signature segment.

The example candidate checker 208 determines whether the time duration of the signature segment exceeds a candidate duration threshold. That is, the example candidate checker 208 determines whether the signature segment has a long enough duration to offset the computing resources used to stitch signatures together. For example, analyzing signature segments and stitching candidate signature segments together requires computing resources, such as memory and time. Thus, analyzing and stitching a relatively short signature segment (e.g., a signature segment with a time duration less than the candidate duration threshold) may not warrant the computing resources required. For example, a signature segment with a time duration of two seconds may not add enough information to warrant the computing resources (e.g., the stitched signature segment cannot be used for crediting, etc.).

In examples disclosed herein, the candidate duration threshold is 60 seconds. However, the candidate duration threshold can be shorter or longer than 60 seconds. For example, the candidate checker 208 determines a first signature segment stored in the buffer 204 has a time duration of 30 seconds and a second signature segment stored in the buffer 204 has a time duration of 70 seconds. The example candidate checker 208 determines the first signature segment does not exceed the candidate duration threshold and, thus, is not a candidate signature segment. The example candidate checker 208 determines the second signature segment does exceed the candidate duration threshold, and, thus, is a candidate signature segment.

In some examples, the candidate duration threshold varies. For example, the candidate checker 208 can increase and/or decrease the candidate duration threshold. In some examples, the candidate checker 208 determines the candidate duration threshold based on one or more of feedback from validation (e.g., validation data), a lack of ability to stitch signature segments (e.g., a stitching ability), etc. For example, if the stitching validator 222 (described below) validates a stitched signature, the candidate checker 208 can decrease the candidate duration threshold (e.g., decrease the candidate duration threshold to 50 seconds, etc.).

The example timing handler 210 of the illustrated example of FIG. 2 aligns a first candidate signature segment and a second candidate signature segment based on time data. That is, the timing handler 210 determines whether the first and second candidate signature segments overlap based on time data. Thus, the example timing handler 210 determines the starting point of the signature segment overlap (e.g., an alignment point). For example, the timing handler 210 determines if a signature of the first candidate signature segment and a signature of the second candidate signature segment have similar time stamps. For example, the timing handler 210 determines if the time stamp of the signature of the first candidate signature segment and the timestamp of the signature of the second candidate signature segment are within a deviation threshold from each other. For example, the deviation threshold can be one (e.g., a first timestamp is +/−1 second from a second timestamp). However, the deviation threshold can be two seconds, three seconds, etc.

The example timing handler 210 adjusts time of content data of stitched signatures. For example, after two candidate signature segments are stitched together, the time data after the stitching point (e.g., the time data corresponding to the signatures of the second candidate signature segment) may not be accurate. That is, at the stitching point, the timestamp of the last signature of the first candidate signature segment may be a greater number (e.g., a later time) than the timestamp of the first signature of the second candidate signature segment. Additionally or alternatively, the timestamp between the first and second signature segments at the stitching point may be greater than the deviation threshold, etc. The example timing handler 210 updates the timestamps corresponding to the signatures of the second candidate signature segment based on the timestamps corresponding to the signatures of the first candidate signature segment. That is, when the first and second candidate signature segments are stitched together, the timestamps of the second candidate signature segment is not inserted.

The example signature matcher 212 of the illustrated example of FIG. 2 determines whether a first and second candidate signature segment corresponds to the same media asset. That is, the example signature matcher 212 determines whether the overlapping signature segment of the first candidate signature segment matches the corresponding overlapping signature segment of the second candidate signature segment. The example signature matcher 212 includes an example signature comparator 214 and an example signature match counter 216.

The example signature comparator 214 of the illustrated example of FIG. 2 compares signatures of the first candidate signature segment to signatures of the second candidate signature segment. For example, the signature comparator 214 performs signature-by-signature matching of the first and second candidate signature segments. In examples disclosed herein, the signature comparator 214 compares the signatures of the first and second candidate signature segments at the starting point of the signature segment overlap.

For example, the signature comparator 214 identifies whether signatures of the second candidate signature segment match the signature of first candidate signature segment at the starting point of the overlap. In some examples, the signature comparator 214 identifies strong matches. As used herein, a strong match or strong signature match refers to a difference between a first and second signature being less than a first deviation threshold. In examples disclosed herein, the first deviation threshold is one. For example, the signature comparator 214 determines a strong signature match if a first signature is 33 and a second signature is 33 (e.g., the difference between the signatures is zero), if a first signature is 33 and a second signature is 34 (e.g., the difference between the signatures is one), etc. However, the first deviation threshold can be two, three, etc. In some examples, the first deviation threshold varies (e.g., the signature comparator 214 determines the first deviation threshold).

In some examples, the signature comparator 214 analyzes ten signatures of the second candidate signature segment for each signature of the first candidate signature segment to identify a strong match. If the example signature comparator 214 does not identify a strong match from ten of the signatures of the second candidate signature segment, the signature comparator 214 selects the subsequent signature of the first candidate signature segment. For example, if the signature comparator 214 does not identify a strong match after analyzing ten of the signatures of the second candidate signature segment compared to the first signature of the first candidate signature segment, the signature comparator 214 analyzes the second signature of the first candidate signature segment. In some examples, the signature comparator analyzes more than or less than ten signatures of the second candidate signature segment for each signature of the first candidate signature segment.

The example signature comparator 214 determines if there is a basic match between the first and second candidate signature segments. As used herein, a basic match refers to a difference between a first and second signature being less than a second deviation threshold. In examples disclosed herein, the second deviation threshold is two. For example, the signature comparator 214 determines a basic signature match if a first signature is 33 and a second signature is 33 (e.g., the difference between the signatures is zero), if a first signature is 33 and a second signature is 35 (e.g., the difference between the signatures is two), etc. However, the first deviation threshold can be three, four, etc. In some examples, the second deviation threshold varies (e.g., the signature comparator 214 determines the second deviation threshold). In examples disclosed herein, the second deviation threshold is greater than the first deviation threshold. That is, in examples disclosed herein, a strong match is also a basic match, but a basic match is not necessarily a strong match. In some examples, the signature comparator 214 determines if there are basic matches between the first and second candidate signature segments in response to the signature match counter 216 determining the number of strong matches satisfies a first match threshold (described below). That is, the example signature comparator 214 determines the first and second candidate signature segments include a match candidate in response to the number of strong matches satisfying the first match threshold.

The example signature comparator 214 determines whether candidate signature segments match. That is, the example signature comparator 214 determines whether the signature sequences of the overlap between first and second candidate signature segments match (e.g., matching segment). In such examples, the signature comparator 214 determines the first and second candidate signature segments correspond to the same media asset. The example signature comparator 214 determines candidate signature segments match in response to the number of basic matches exceeding a second match threshold. In examples disclosed herein, the second match threshold is 15. However, the second match threshold can be greater than or less than 15. In some examples, the second match threshold varies (e.g., the signature comparator 214 determines the second match threshold).

The example signature match counter 216 of the illustrated example of FIG. 2 obtains the output from the example signature comparator 214 corresponding to a number, if any, of strong matches and/or basic matches. For example, the signature comparator 214 provides information indicative of the evaluation of the candidate signature segments to the signature match counter 216. In examples disclosed herein, the example signature match counter 216 includes a counter, such as a device which stores a number of times first and second candidate signature segments correspond to a strong match. If the example signature match counter 216 determines that strong matches were detected, the example signature match counter 216 increments the counter to the number of strong matches that were detected. For example, if the signature comparator 214 detected four strong matches, the signature match counter 216 stores a count of four strong matches. If the example signature match counter 216 does not receive information indicative of a detection of strong matches, the example signature match counter 216 updates the strong match count with a count of zero.

Additionally or alternatively, the example signature match counter 216 stores a number of times first and second candidate signature segments correspond to a basic match. If the example signature match counter 216 determines that basic matches were detected, the example signature match counter 216 increments the counter to the number of basic matches that were detected. For example, if the signature comparator 214 detected ten basic matches, the signature match counter 216 stores a count of ten basic matches. If the example signature match counter 216 does not receive information indicative of a detection of basic matches, the example signature match counter 216 updates the basic match count with a count of zero.

The example candidate stitcher 218 of the illustrated example of FIG. 2 stitches candidate signature segments together. The example candidate stitcher 218 determines whether to stitch a first and a second candidate signature segment together. For example, if the signature comparator 214 determines the overlap between the first and second candidate signature segments match (e.g., the number of basic matches exceeds the second match threshold), the candidate stitcher 218 stitches the first and second candidate signature segments together. If the example candidate stitcher 218 determines to stitch candidate signature segments together, the example candidate stitcher 218 determines a stitching point. That is, the example candidate stitcher 218 determines at what point in the first and second candidate signature segments to connect the first candidate signature segment to the second signature segment. In some examples, the example candidate stitcher 218 determines the middle of the overlap between the first and second candidate signature segments is the stitching point. However, the candidate stitcher 218 can determine any signature of the overlap is the stitching point (e.g., the first signature of the overlap, the last signature of the overlap, etc.). The example candidate stitcher 218 flags the selected signature as the stitching point.

The example candidate stitcher 218 discards signatures of the first candidate signature segment after the stitching point. The example candidate stitcher 218 inserts signatures from the second candidate signature segment corresponding to the stitching point. That is, at the stitching point, the signatures of the second candidate signature segment replace the signatures of the first candidate signature segment. Thus, the example candidate stitcher 218 generates a stitched signature, including signatures of both the first and second candidate signature segments. The stitched signature corresponds to the same media asset as the first and second candidate signature segments. The stitched signature has a longer time duration than both the first and second candidate signature segments. In some examples, the example candidate stitcher 218 stores the stitched signature in the reference signature database 220.

The reference signature database 220 of the illustrated example of FIG. 2 stores signatures. For example, the reference signature database 220 stores generated reference signatures created or otherwise obtained by the data center 108. In some examples, the reference signature database 220 includes reference unhashed signatures and/or referenced hashed signatures. In some examples, the media monitoring entity associated with the reference signature database 220 can directly monitor media source feeds to generate reference unhashed signatures and/or hashed signatures. In some examples, the media monitoring entity generates reference unhashed signatures and/or hashed signatures from downloaded media (e.g., SVOD assets), etc. In examples disclosed herein, reference signatures are generated using the same or similar techniques as the monitored media signatures, such that the monitored media signatures and reference signatures of the same asset match. In some examples, each reference signature stored in the reference signature database 220 is associated with a specific reference media asset, such as, but not limited to, episodes of television programs (e.g., episodes of Game of Thrones, The Office, etc.), movies of a movie collection (e.g., The Marvel Cinematic Universe, etc.), etc. In some examples, each reference signature stored in the reference signature database 220 is associated with a timestamp, which indicates a position in the reference media asset represented by the reference signature. In some examples, the reference signature database 220 can include a library (e.g., database, table, etc.) of reference hashed signatures. Additionally or alternatively, the reference signature database 220 stores stitched signatures. For example, the reference signature database 220 stores stitched signatures generated by the candidate stitcher 218.

The example stitching validator 222 validates stitched signatures. That is, the example stitching validator 222 validates stitched signatures generated by the example candidate stitcher 218. The example stitching validator 222 obtains a reference signature from the example reference signature database 220. In some examples, the reference signature is a signature sequence of the media asset created or otherwise obtained by the data center 108 based on a continuous viewing of the media asset. The example stitching validator 222 identifies the stitching point in the stitched signature. For example, the stitching validator 222 identifies the stitching point based on the flag set by the candidate stitcher 218. The example stitching validator 222 compares the stitched signature to the reference signature at the stitching point.

In examples disclosed herein, the stitching validator 222 determines a validation start point and a validation end point in the stitched signature (e.g., a validation segment). That is, the stitching validator 222 determines a validation segment in the stitched signature. For example, the validation start point can be a time duration before the stitching point and the validation end point can be a time duration after the stitching point. In some examples, the time duration is 10 seconds. That is, the example stitching validator 222 determines the validation start point is 10 seconds before the stitching point and the validation end point is 10 seconds after the stitching point. However, the time duration can be greater or less than 10 seconds. For example, the validation start point can be eight seconds before the stitching point, the validation end point can be 12 seconds after the stitching point, etc.

Thus, the example stitching validator 222 performs signature-by-signature matching between the stitched signature and the reference signature. The example stitching validator 222 determines if there are mismatches between the stitched signature and the reference signature. For example, the stitching validator 222 counts the number of continuous basic matches between the stitched signature and the reference signature. In some examples, the stitching validator 222 identifies a mismatch between signatures of the stitched signature and the reference signature. That is, a signature of the stitched signature and a signature of the reference signature are not within the second deviation threshold (e.g., are not a basic match). In such examples, the stitching validator 222 determines a count of mismatches between the stitched signature and the reference signature.

The example stitching validator 222 determines if the stitched signature is validated. For example, the stitching validator 222 determines the stitched signature is validated if the number of mismatches does not exceed a mismatch threshold. The mismatch threshold can be one. However, the mismatch threshold can be greater than one (e.g., two, three, etc.). For example, if the mismatch threshold is one, and the stitching validator 222 counted zero mismatches between the stitched signature and the reference signature, the stitching validator 222 validates the stitched signature. That is, the stitching validator 222 determines the stitched signature can be used for future crediting of the media asset and/or previous crediting is accurate (e.g., media exposures credited to the stitched signature before the corresponding reference signature was generated are correct).

In some examples, the stitching validator 222 determines the stitched signature is not accurate (e.g., the number of mismatches is greater than the mismatch threshold). For example, the stitched signature may be missing signatures compared to the reference signature, the stitched signature may have additional signatures compared to the reference signature, etc. In some examples, the stitching validator 222 flags the stitched signature for manual inspection by an analyst. For example, the analyst may determine the mismatches identified by the stitching validator 222 are normal PAS behavior.

Figure 3:
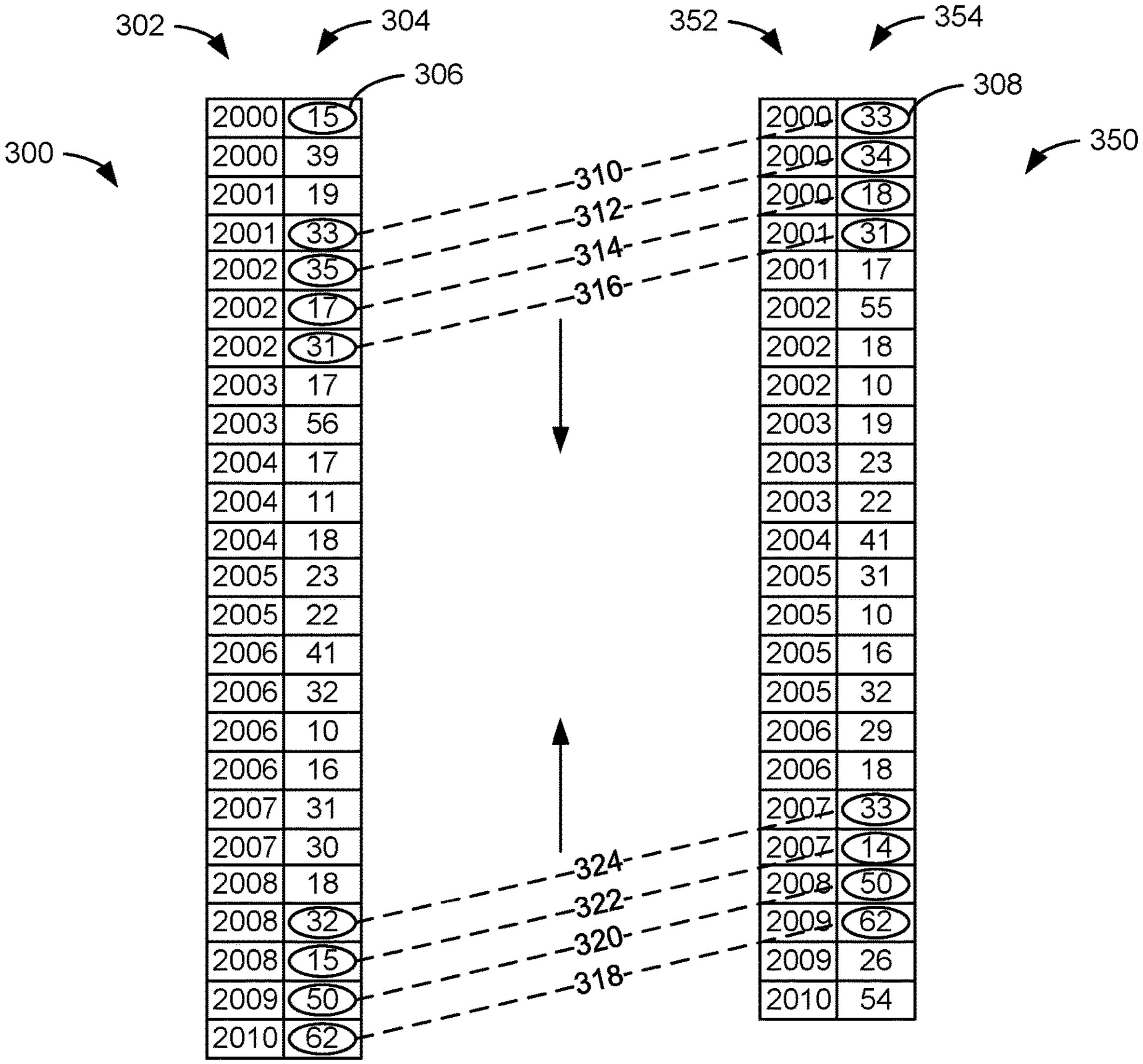
FIG. 3 is an example illustration of an example first candidate signature segment and an example second candidate signature segment.

FIG. 3 is an example illustration of an example first candidate signature segment 300 and an example second candidate signature segment 350. The first candidate signature segment 300 includes timestamps 302 and signatures 304 and the second candidate signature segment 350 includes timestamps 352 and signatures 354. In the illustrated example of FIG. 3, the timing handler 210 (FIG. 2) aligns the candidate signature segments 300, 350 based on the timestamps 302, 352. For example, the signature 306 of the first candidate signature segment 300 and the signature 308 of the second candidate signature segment 350 both correspond to the time 2,000. However, the first signature 306 is 15 and the second signature 308 is 33. Thus, the example signature comparator 214 (FIG. 2) determines the signatures 306, 308 do not match (e.g., the difference between the signatures 306, 308 exceeds the second deviation threshold and, thus, is not a basic match or a strong match).

In the illustrated example of FIG. 3, the signature comparator 214 identifies an example first strong match 310 (e.g., between the fourth signature of the first candidate signature segment 300 and the first signature of the second candidate signature segment 350), an example second strong match 312 (e.g., between the fifth signature of the first candidate signature segment 300 and the second signature of the second candidate signature segment 350), an example third strong match 314 (e.g., between the sixth signature of the first candidate signature segment 300 and the third signature of the second candidate signature segment 350), and an example fourth strong match 316 (e.g., between the seventh signature of the first candidate signature segment 300 and the fourth signature of the second candidate signature segment 350). Thus, the signature match counter 216 determines there are four consecutive strong matches between the candidate signature segments 300, 350.

Additionally or alternatively, the signature comparator 214 identifies an example fifth strong match 318 (e.g., between the twenty-fifth signature of the first candidate signature segment 300 and the twenty-second signature of the second candidate signature segment 350), an example sixth strong match 320 (e.g., between the twenty-fourth signature of the first candidate signature segment 300 and the twenty-first signature of the second candidate signature segment 350), an example seventh strong match 322 (e.g., between the twenty-third signature of the first candidate signature segment 300 and the twentieth signature of the second candidate signature segment 350), and an example eighth strong match 324 (e.g., between the twenty-second signature of the first candidate signature segment 300 and the nineteenth signature of the second candidate signature segment 350). Thus, the signature match counter 216 determines there are an additional four consecutive strong matches between the candidate signature segments 300, 350.

Figure 4:
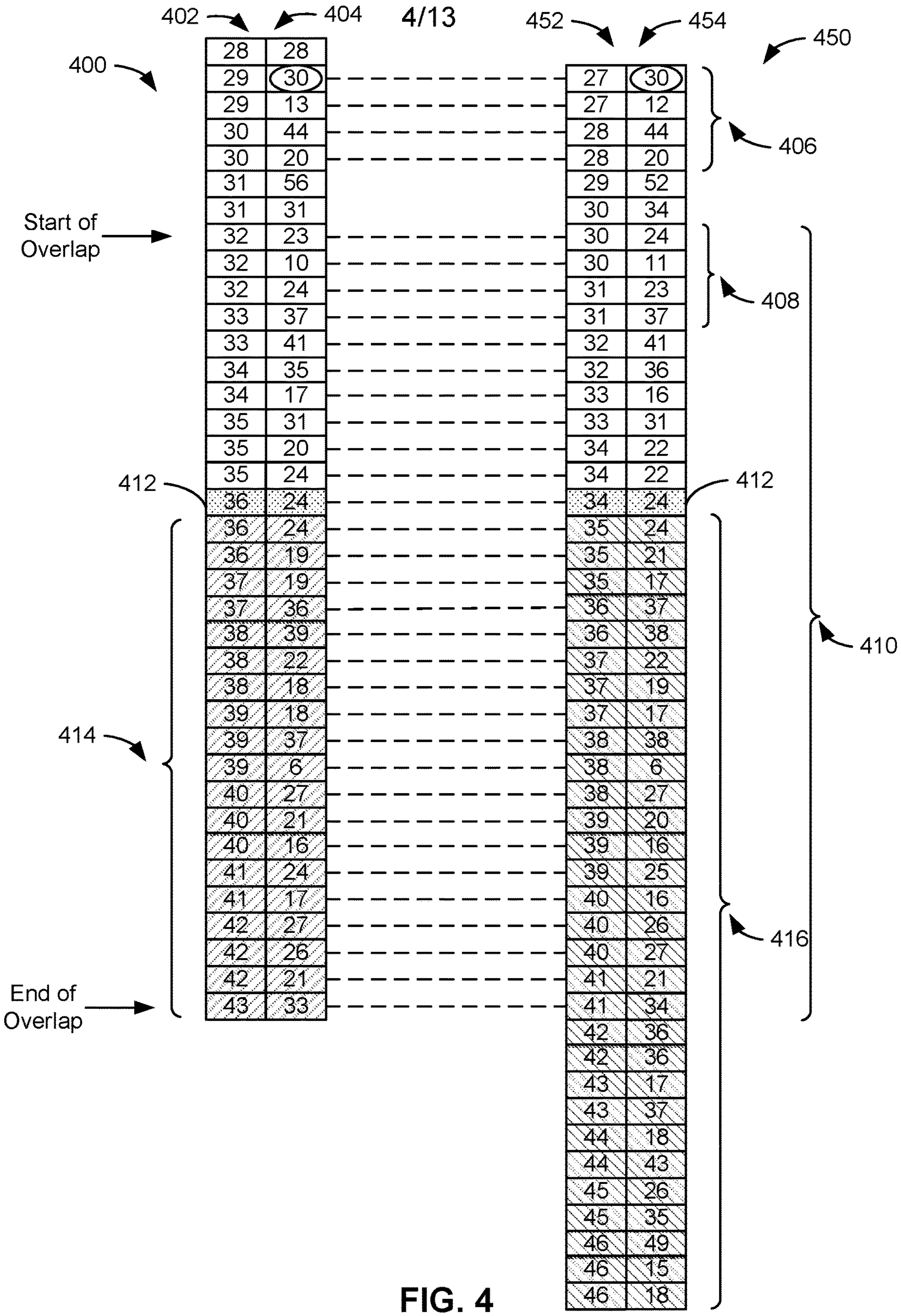
FIG. 4 is an example illustration of an example first candidate signature segment and an example second candidate signature segment that overlap.

FIG. 4 is an example illustration of an example first candidate signature segment 400 and an example second candidate signature segment 450 that overlap. The first candidate signature segment 400 includes timestamps 402 and signatures 404 and the second candidate signature segment 450 includes timestamps 452 and signatures 454. The example signature comparator 214 (FIG. 2) identifies a first match candidate 406. That is, the example signature comparator 214 identified four strong matches between the candidate signature segments 400, 450. Thus, in response to the number of strong matches satisfying the first match threshold, the example signature comparator 214 determines to identify basic matches. However, the example signature matcher 212 (FIG. 2) discards the first match candidate 406 because the next signatures of the candidate signature segments 400, 450 are not basic matches (e.g., the difference between 56 and 52 is not within the second deviation threshold).

The example signature comparator 214 identifies a second match candidate 408. That is, the signature comparator 214 identified four continuous strong matches in the second match candidate 408. The number of strong matches satisfies the first match threshold of 4. Thus, the example signature comparator 214 determines basic matches. In some examples, the first match threshold varies (e.g., the signature comparator 214 determines the first match threshold). In the illustrated example of FIG. 4, the signature comparator 214 identified an example overlap 410. That is, the signature comparator 214 identified 30 continuous basic matches between the candidate signature segments 400, 450. In some examples, the signature match counter 216 stores the number of strong matches and/or basic matches.

In the illustrated example of FIG. 4, the number of basic matches satisfies the second match threshold of 15. Thus, the candidate stitcher 218 (FIG. 2) determines to stitch the candidate signature segments 400, 450 together. The candidate stitcher 218 determines an example stitching point 412. The example stitching point 412 is part of the overlap 410. The example candidate stitcher 418 discards the example signatures 414 of the first candidate signature segment 400. That is, the example signatures 414 of the example first candidate signature segment 400 are after the example stitching point 412. The example second candidate signature segment 450 includes example signatures 416 after the stitching point 412. In examples disclosed herein, the candidate stitcher 418 replaces the signatures 414 of the first candidate signature segment 400 with the signatures 416 of the second candidate signature segment 450.

Figure 5:
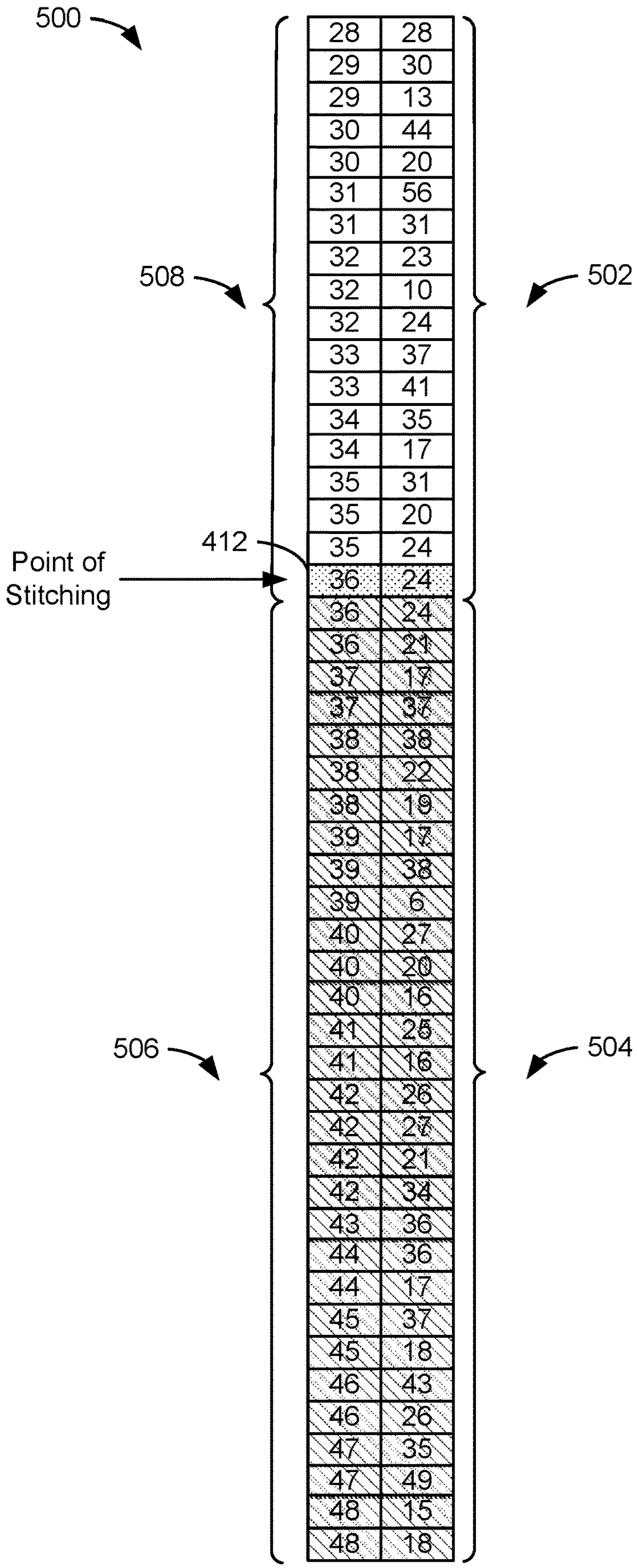
FIG. 5 is an example illustration of an example stitched signature generated in accordance with teachings of this disclosure based on the first candidate signature segment and the second candidate signature segment of FIG. 4.

FIG. 5 is an example illustration of an example stitched signature 500 generated in accordance with teachings of this disclosure based on the first candidate signature segment 400 and the second candidate signature segment 450 of FIG. 4. The example stitched signature 500 includes example signatures 502. The example signatures 502 correspond to the first candidate signature segment 400. The example signatures 502 include the example stitching point 412 (FIG. 4). The stitched signature 500 includes example signatures 504. The example signatures 504 correspond to the second candidate signature segment 450 (e.g., the signatures 416 (FIG. 4)).

The example timing handler 210 (FIG. 2) updates example timestamps 506 corresponding to the signatures 504. That is, the example candidate stitcher 218 does not use the timestamps 452 (FIG. 4) of the signatures 416. Instead, the timing handler 210 determines timestamps 506 based on example timestamps 508 corresponding to the first candidate signature segment 400 for logical consistency.

Figure 6:
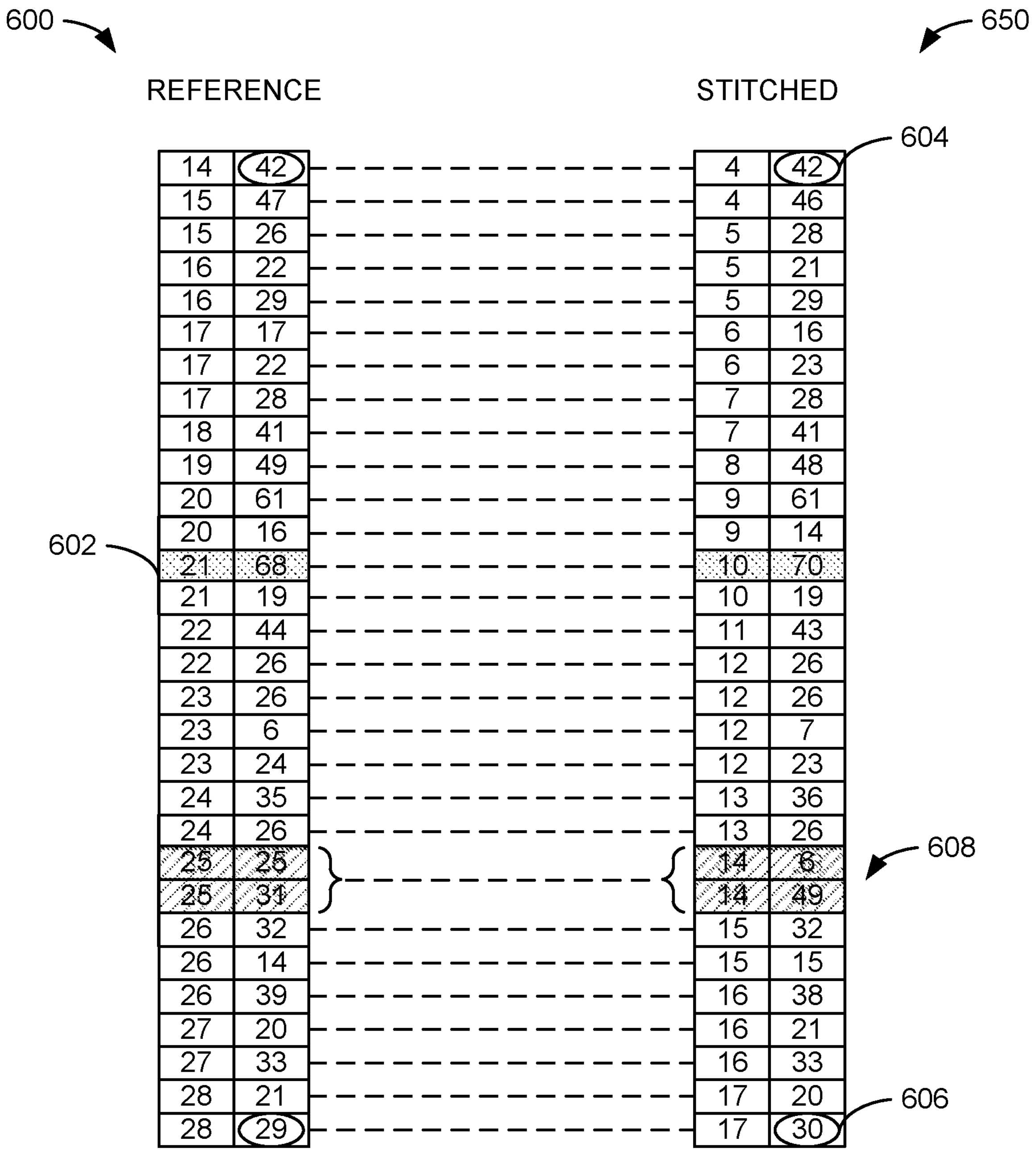
FIG. 6. is an example illustration of an example reference signature and an example stitched signature that is validated.

FIG. 6. is an example illustration of an example reference signature 600 and an example stitched signature 650 that is validated. The example stitching validator 222 (FIG. 2) identifies the example stitching point 602. The example stitching validator 222 identifies an example validation start point 604 and an example validation end point 606. For example, the validation start point 604 is 12 signatures before the stitching point 602 and the validation end point 606 is 17 signatures after the stitching point 602. The example stitching validator 222 performs signature-by-signature matching starting at the validation start point 604 and the validation end point 606.

In the illustrated example of FIG. 6, there is example normal PAS behavior 608. The example normal PAS behavior 608 includes two signatures. The two signatures of the normal PAS behavior 608 do not correspond to a strong or basic match with respect to the reference signature. However, the normal PAS behavior 608 is not a mismatch and, thus, the stitched signature 650 is validated.

Figure 7:
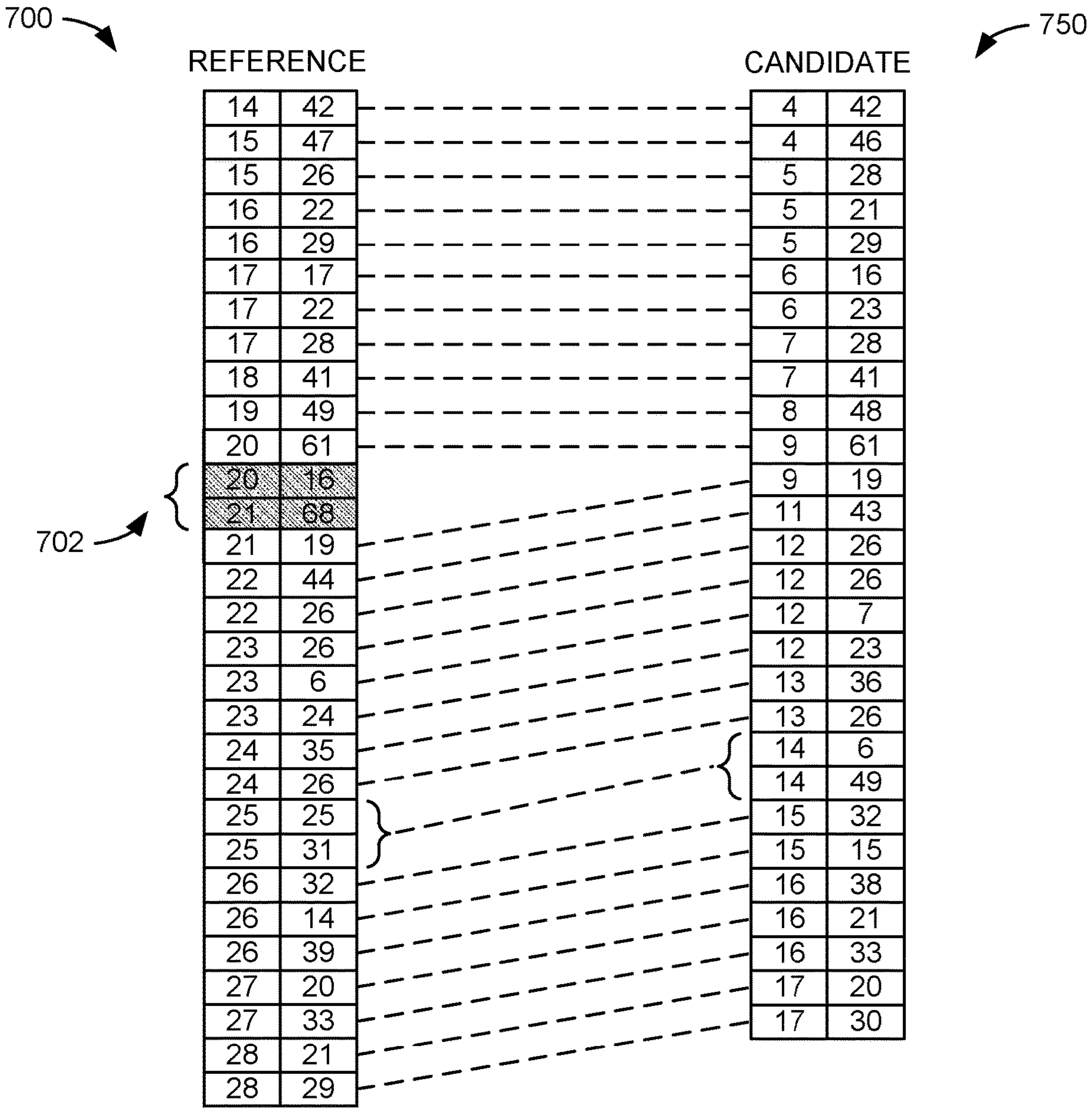
FIG. 7 is an example illustration of an example reference signature and an example stitched signature that is not validated.

FIG. 7 is an example illustration of an example reference signature 700 and an example stitched signature 750 that is not validated. The example reference signature 700 includes example signatures 702. The example stitched signature 750 is missing the signatures 702. Thus, the stitching validator 222 (FIG. 2) determines a mismatch count of two. The stitching validator 222 determines the mismatch count is greater than the mismatch threshold and, thus, the stitched signature 750 is not validated. In some examples, the stitching validator 222 flags the stitched signature 750 for further inspection.

While an example manner of implementing the meter data analyzer 110 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example buffer 204, the example signature handler 206, the example candidate checker 208, the example timing handler 210, the example signature matcher 212, the example signature comparator 214, the example signature match counter 216, the example candidate stitcher 218, the example reference signature database 220, the example stitching validator 222, and/or, more generally, the example meter data analyzer 110 of FIG. 2 may be implemented by hardware, software, firmware and/or any combination of hardware, software and/or firmware. Thus, for example, any of the example network interface 202, the example buffer 204, the example signature handler 206, the example candidate checker 208, the example timing handler 210, the example signature matcher 212, the example signature comparator 214, the example signature match counter 216, the example candidate stitcher 218, the example reference signature database 220, the example stitching validator 222 and/or, more generally, the example meter data analyzer 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, network interface 202, the example buffer 204, the example signature handler 206, the example candidate checker 208, the example timing handler 210, the example signature matcher 212, the example signature comparator 214, the example signature match counter 216, the example candidate stitcher 218, the example reference signature database 220, and/or the example stitching validator 222 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter data analyzer 110 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the meter data analyzer 110 of FIGS. 1 and/or 2 are shown in FIGS. 8-11. The machine readable instructions may be one or more executable programs or portion(s) of an executable program for execution by a computer processor and/or processor circuitry, such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 8-11, many other methods of implementing the example meter data analyzer 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 8:
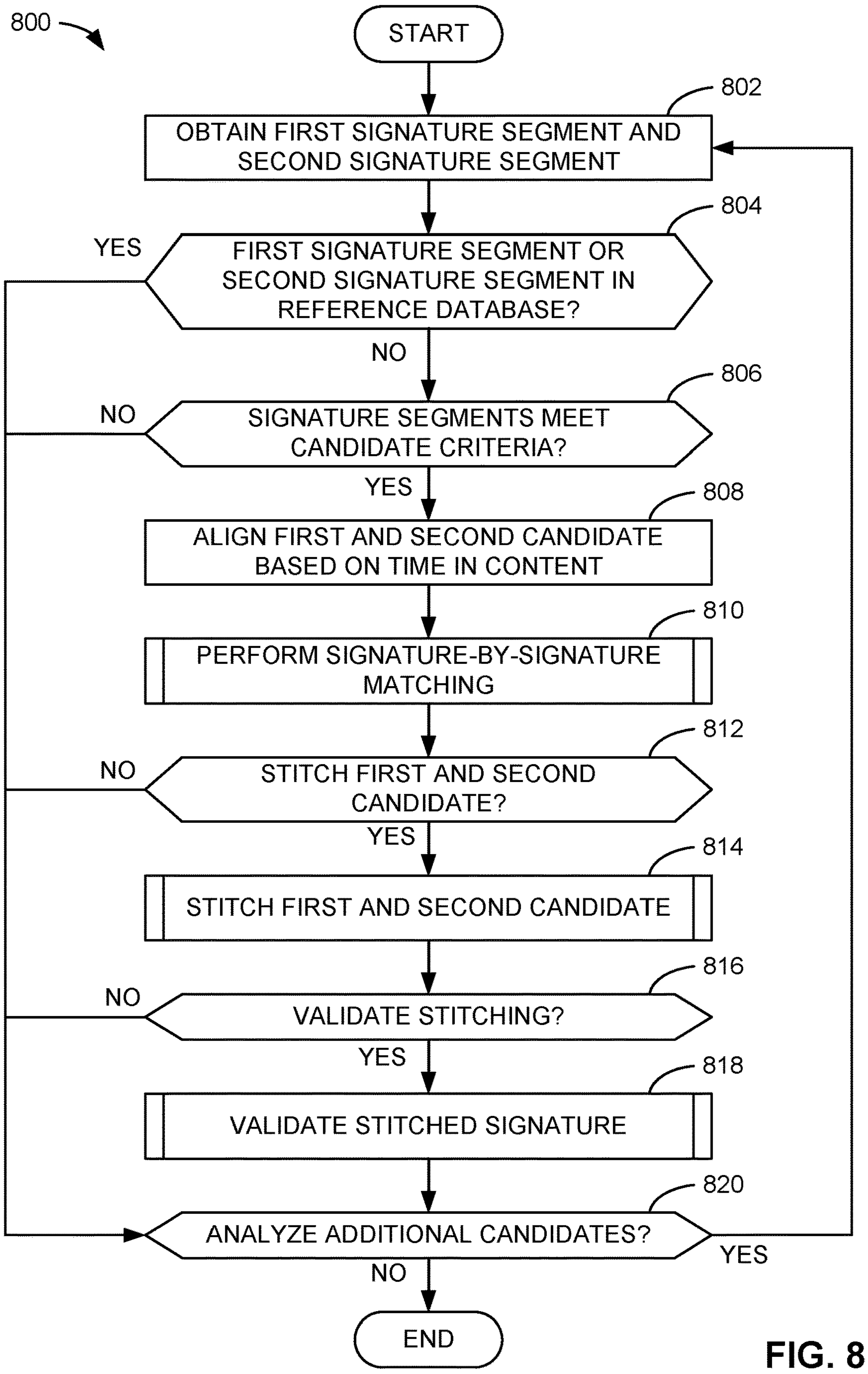
FIG. 8 is a flowchart representative of machine-readable instructions which may be executed to implement the example meter data analyzer of FIGS. 1 and/or 2 to perform signature stitching.

FIG. 8 is a flowchart representative of machine-readable instructions which may be executed to implement the example meter data analyzer 110 of FIGS. 1 and/or 2 to perform signature stitching. The example process 800 of the illustrated example of FIG. 8 begins when the example network interface 202 (FIG. 2) obtains a first signature segment and a second signature segment (block 802). For example, the network interface 202 receives monitoring data 104A, 104B, 104C from the example network 106. In some examples, the network interface 202 can convert the received monitoring data 104A, 104B, 104C into a format readable by the meter data analyzer 110.

The example candidate checker 208 (FIG. 2) determines if the first signature segment or the second signature segment are stored in the example reference signature database 220 (FIG. 2) (block 804). For example, the candidate checker 208 compares the first and second signature segments in the monitoring data 104A, 104B, 104C to the reference signatures stored in the reference signature database 220. In some examples, the candidate checker 208 uses unhashed (e.g., linear) signature matching. In some examples, the candidate checker 208 uses hashed signature matching. If the example candidate checker 208 determines the first signature segment or the second signature segment is in the example reference signature database 220, control proceeds to block 820.

If the example candidate checker 208 determines the first signature segment and the second signature segment are not in the reference signature database 220, the example candidate checker 208 determines if the first and second signature segments meet candidate criteria (block 806). For example, the candidate checker 208 determines the time duration of the first signature segment and the time duration of the second signature segment. The example candidate checker 208 compares the time durations of the first and second signature segments to a candidate duration threshold. In some examples, the candidate duration threshold is 60 seconds. If the candidate checker 208 determines the first or second signature segments do not exceed the candidate duration threshold, control proceeds to block 820.

If, at block 806, the candidate checker 208 determines the time durations of the first and second signature segments exceed the candidate duration threshold, the candidate checker 208 flags the first and second signature segments as candidate signature segments and the example timing handler 210 (FIG. 2) aligns the first and second candidate signature segments based on timestamps of the first and second signature segments (block 808). For example, the timing handler 210 compares the timestamps of the first and second candidate signature segments. The timing handler 210 determines an alignment point in the first and second candidate signature segments.

The example signature matcher 212 (FIG. 2) performs signature-by-signature matching (block 810). For example, the signature matcher 212 compares the first candidate signature segment to the second candidate signature segment at the alignment point. The example signature matcher 212 determines whether the overlap between the first and second candidate signature segments match. An example implementation of the signature-by-signature matching process 810 of FIG. 8 is described in further detail in connection with FIG. 9.

The example candidate stitcher 218 (FIG. 2) determines whether to stitch the first candidate signature segment and the second candidate signature segment together (block 812). For example, the candidate stitcher 218 determines if the first and second candidate signature segments match based on the determination of the example signature matcher 212. If the example candidate stitcher 218 determines to not stitch the first and second candidate signature segments together, control proceeds to block 820. If the example candidate stitcher 218 determines to stitch the first and second candidate signature segments together, the example candidate stitcher 218 stitches the first and second candidate signature segments (block 814). An example implementation of the stitching process 814 of FIG. 8 is described in further detail in connection with FIG. 10.

The example stitching validator 222 (FIG. 2) determines whether to validate the stitched signature (block 816). For example, the stitching validator 222 may determine whether a reference signature is stored in the reference signature database 220 and, if so, determine to validate the stitched signature. If the stitching validator 222 determines to not validate the stitched signature, control proceeds to block 820. If the stitching validator 222 determines to validate the stitched signature, the stitching validator 222 compares the stitched signature to a reference signature to validate the stitched signature (block 816). For example, the stitching validator 222 performs signature-by-signature matching between the stitched signature and the reference signature. An example implementation of the validation process 818 of FIG. 8 is described in further detail in connection with FIG. 11.

The meter data analyzer 110 determines whether to analyze additional signatures (block 820). For example, if the network interface 202 obtains additional signature segments, the meter data analyzer 110 may determine to analyze the additional signature segments. If, at block 820, the meter data analyzer 110 determines to analyze additional signature segments, the program 800 returns to block 802. Otherwise, the program 800 ends.

Figure 9:
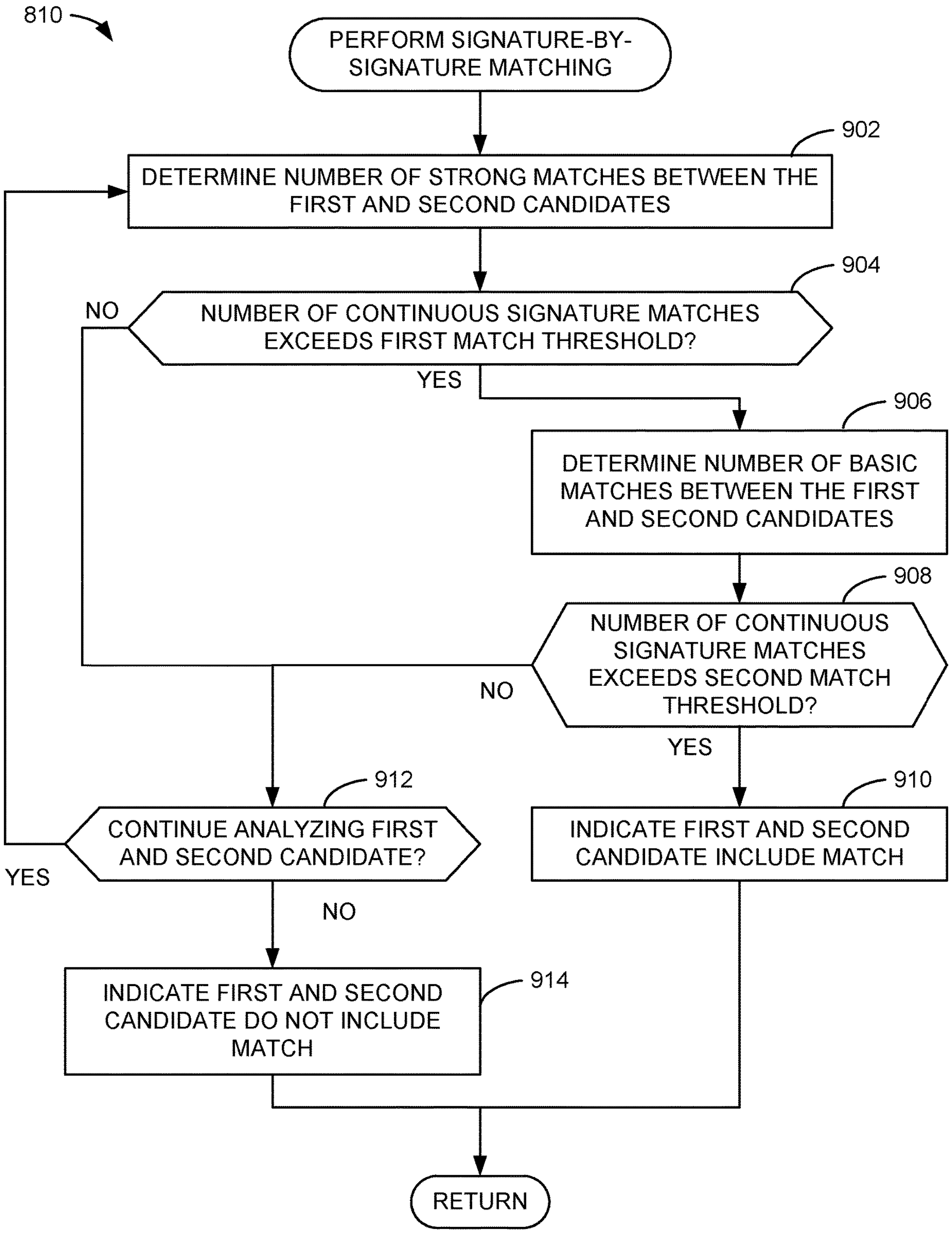
FIG. 9 is a flowchart representative of machine-readable instructions which may be executed to implement an example signature matcher of FIG. 2 to perform signature-by-signature matching.

FIG. 9 is a flowchart representative of machine-readable instructions which may be executed to implement the example signature matcher 212 of FIG. 2 to perform signature-by-signature matching. The example candidate checker 208 (FIG. 2) determines a number of strong matches between the first and second candidate signature segments (block 902). For example, the candidate checker 208 compares signatures of the first and second candidate signature segments using a first deviation threshold. In some examples, the first deviation threshold is one. The example signature match counter 216 (FIG. 2) increments a strong match count if the signatures of the first and second candidate signature segments do not exceed the first deviation threshold.

The example candidate checker 208 determines if the number of continuous strong signature matches exceeds a first match threshold (block 904). For example, the candidate checker 208 compares the strong match count determined by the signature match counter 216 to the first match threshold. In some examples, the first match threshold is four. If the example candidate checker 208 determines the number of continuous strong matches does not exceed the first match threshold, control proceeds to block 912.

If, at block 904, the example candidate checker 208 determines the number of continuous strong signature matches does exceed the first match threshold, the example signature handler 206 determines a number of basic matches between the first and second candidate signature segments (block 906). For example, the candidate checker 208 compares the signatures of the first and second candidate signature segments using a second deviation threshold. That is, the candidate checker 208 determines whether a signature of the first candidate signature segment and a signature of the second candidate signature segment are a basic match if the difference between the signatures is less than the second deviation threshold. In some examples, the second deviation threshold is two. The example signature match counter 216 increments a basic signature match if the candidate checker 208 determines the signatures of the first and second candidate signature segments are a basic match.

The example signature matcher 212 determines if the number of continuous basic signature matches exceeds a second match threshold (block 908). For example, the candidate checker 208 compares the number of basic signature matches determined by the signature match counter 216 to the second match threshold. In some examples, the second match threshold is 15. If the signature matcher 212 determines the number of continuous basic signature matches exceeds the second threshold, the candidate checker 208 indicates the first and second candidate signature segments include a match (block 910). That is, the first candidate signature segment includes signatures that match (e.g., strong match, basic match, etc.) the second candidate signature segment (e.g., a matching segment).

Returning to block 908, if the example signature matcher 212 determines the number of continuous basic signature matches do not exceed the second match threshold, the signature handler 206 determines whether to continue analyzing the first and second candidate signature segments (block 912). For example, the signature handler 206 may determine to continue analyzing the first and second candidate signature segments if the first candidate signature segment includes signatures that have not been analyzed. If the signature handler 206 determines to continue analyzing the first and second candidate signature segments, control returns to block 902. If the example signature handler 206 determines to not continue analyzing the first and second candidate signature segments, the example signature handler 206 indicates the first and second candidate signature segments do not include a match (block 914). That is, the first candidate signature segment does not include a number of continuous signatures that match (e.g., strong match, basic match, etc.) the second candidate signature segment. The example meter data analyzer 110 (FIG. 1) returns to block 812 of process 800 of FIG. 8.

Figure 10:
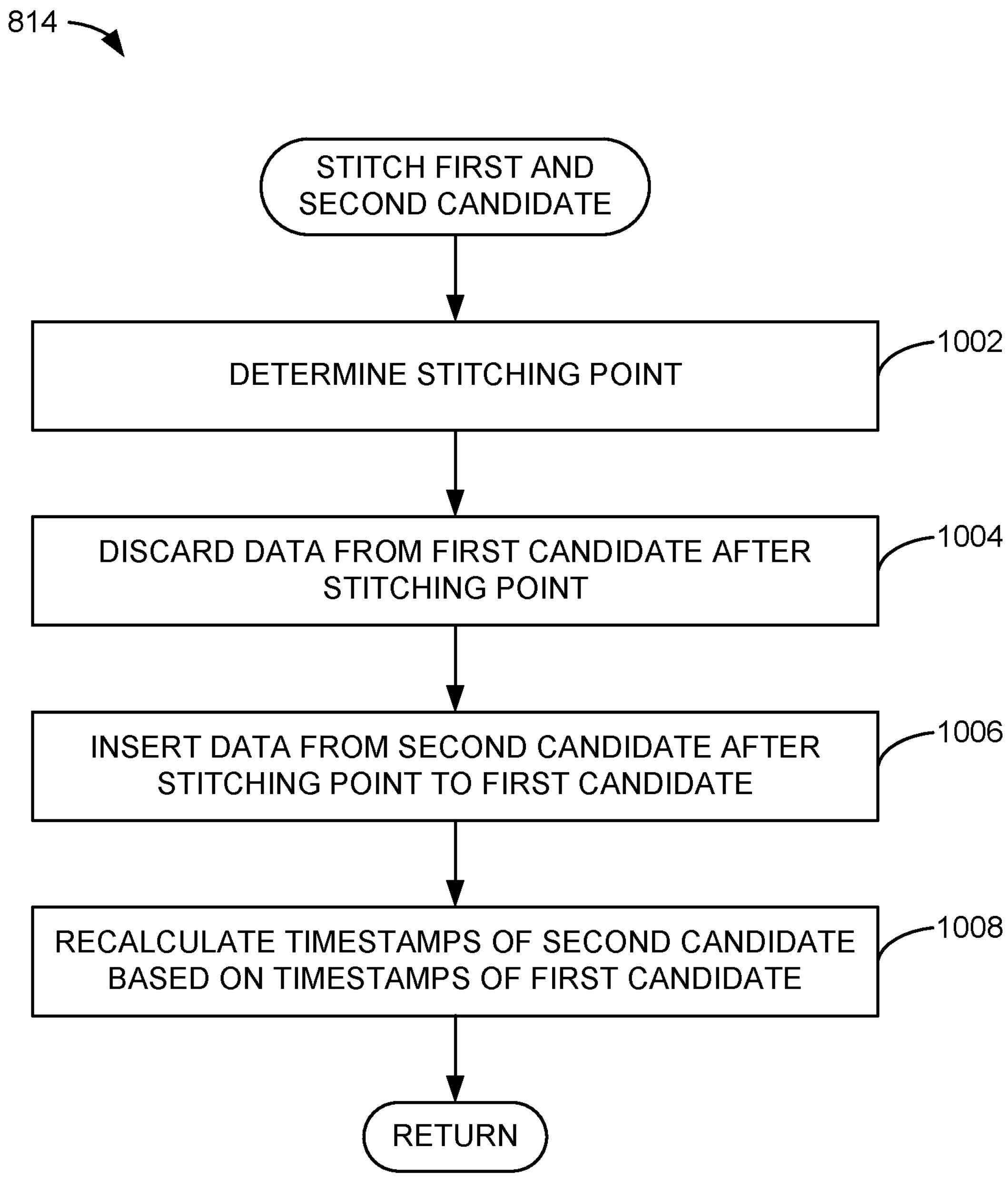
FIG. 10 is a flowchart representative of machine-readable instructions which may be executed to implement an example candidate stitcher of FIG. 2 to stitch candidate signature segments together.

FIG. 10 is a flowchart representative of machine-readable instructions which may be executed to implement an example candidate stitcher 218 of FIG. 2 to stitch candidate signature segments together. The example candidate stitcher 218 determines a stitching point (block 1002). For example, the candidate stitcher 218 determines a signature in the matching segment of the first and second candidate signature segments to be the stitching point. In some examples, the candidate stitcher 218 determines the middle signature of the matching segment is the stitching point, the first signature of the matching segment is the stitching point, the last signature of the matching segment is the stitching point, etc.

The example candidate stitcher 218 discards data from the first candidate signature segment after the stitching point (block 1004). For example, the candidate stitcher 218 removes the time stamps and the signatures of the first candidate signature segment after the stitching point. The example candidate stitcher 218 inserts data from the second candidate signature segment after the stitching point to the first candidate signature segment (block 1006). For example, the candidate stitcher 218 inserts the timestamps and the signatures of the second candidate signature segment after the stitching point to the signatures of the first candidate signature segment. That is, the candidate stitcher 218 generates a stitched signature.

The example timing handler 210 (FIG. 2) recalculates the timestamps of the second candidate signature segment based on the timestamps of the first candidate signature segment of the stitched signature (block 1008). For example, the timing handler 210 determines timestamps of the signatures of the second candidate signature segment after the stitching point based on the time stamps of the signatures of the first candidate signature segment. In some examples, the candidate stitcher 218 stores the stitched signature in the reference signature database 220 (FIG. 2). The example meter data analyzer 110 (FIG. 1) returns to block 816 of process 800 of FIG. 8.

Figure 11:
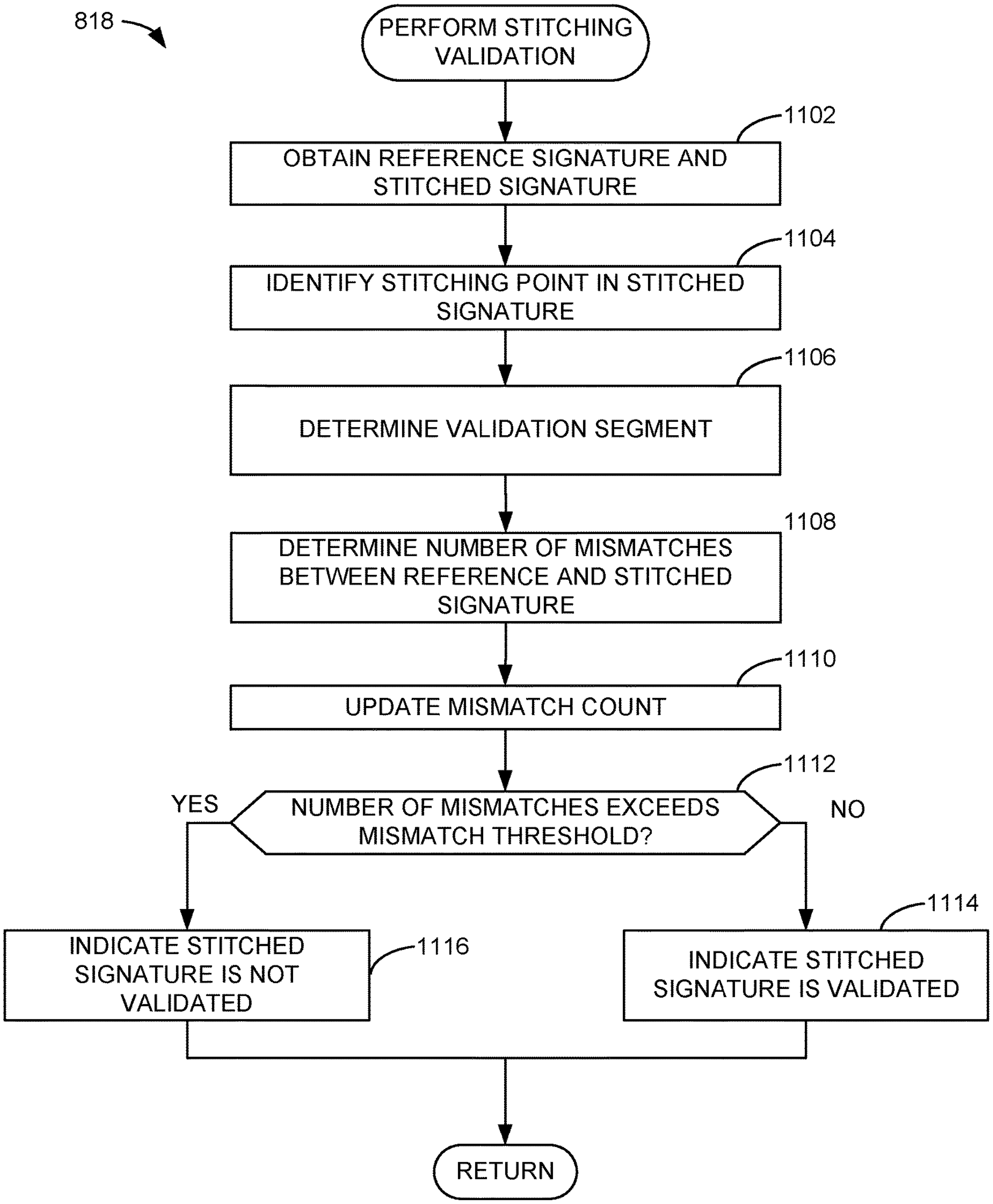
FIG. 11 is a flowchart representative of machine-readable instructions which may be executed to implement an example stitching validator of FIG. 2 to validate stitched signatures.

FIG. 11 is a flowchart representative of machine-readable instructions which may be executed to implement the example stitching validator 222 of FIG. 2 to validate stitched signatures. The example stitching validator 222 obtains a reference signature and a stitched signature (block 1102). For example, the stitching validator 222 obtains the reference signature and the stitched signature from the reference signature database 220 (FIG. 2). The example stitching validator 222 identifies the stitching point in the stitched signature (block 1104). For example, the stitching validator 222 identifies the flag set by the candidate stitcher 218 (FIG. 2) corresponding to the signature of the stitching point.

The example stitching validator 222 determines a validation segment (block 1106). For example, the stitching validator 222 determines a validation start point and a validation end point in the stitched signature. In some examples, the stitching validator 222 determines the validation start point is a time duration before the stitching point and the validation end point is a time duration after the stitching point. In some examples, the time duration is ten seconds. In some examples, the validation segment is the sequence of signatures between the validation start point and the validation end point.

The example stitching validator 222 determines a number of mismatches between the stitched signature and the reference signature in the validation segment (block 1108). For example, the stitching validator 222 compares the signatures of the stitched signature to the signatures of the reference signature. In some examples, if the difference between the signatures of the stitched signature and the reference signature are greater than the first deviation threshold corresponding to a strong match, the stitching validator 222 determines a mismatch.

The example stitching validator 222 updates the mismatch count (block 1110). For example, if the stitching validator 222 identified two mismatches between the stitched signature and the reference signature, the stitching validator 222 updates the mismatch count to two mismatches. The example stitching validator 222 determines if the number of mismatches exceeds a mismatch threshold. For example, the stitching validator 222 compares the number of mismatches to the mismatch threshold. In some examples, the mismatch threshold is one. If the example stitching validator 222 determines the number of mismatches does not exceed the mismatch threshold, the example stitching validator 222 indicates the stitched signature is validated (block 1114). For example, the stitching validator 222 can flag the stitched signature as validated.

Returning to block 1112, if the example stitching validator 222 determines the number of mismatches exceeds the mismatch threshold, the stitching validator 222 indicates the stitched signature is not validated (block 1116). For example, the stitching validator 222 flags the stitched signature as not validated. In some examples, the flag that the stitched signature is not validated indicates the stitched signature requires further inspection. The example meter data analyzer 110 (FIG. 1) returns to block 820 of process 800 of FIG. 8.

Figure 12:
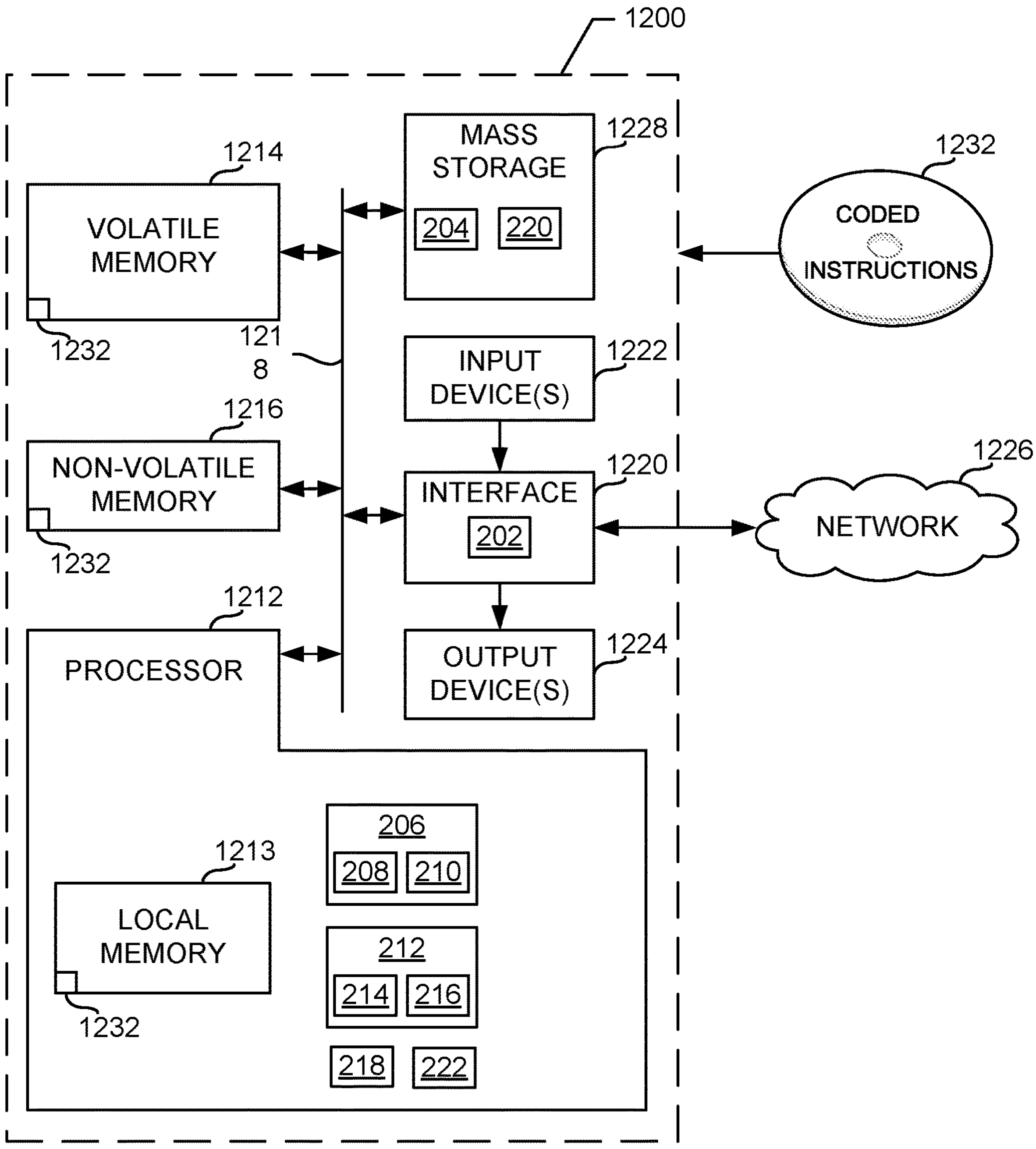
FIG. 12 is a block diagram of an example processing platform structured to execute the instructions of FIGS. 8-11 to implement the example meter data analyzer of FIGS. 1 and/or 2.

FIG. 12 is a block diagram of an example processor platform 1200 structured to execute the instructions of FIGS. 8-11 to implement the meter data analyzer 110 of FIGS. 1 and/or 2. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example signature handler 206, the example candidate checker 208, the example timing handler 210, the example signature matcher 212, the example signature comparator 214, the example signature match counter 216, the example candidate stitcher 218, and the example stitching validator 222.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 8-11 may be stored in the mass storage device 1228, in the volatile memory 1214, in the non-volatile memory 1216, and/or on a removable non-transitory computer readable storage medium such as a CD or DVD.

Figure 13:
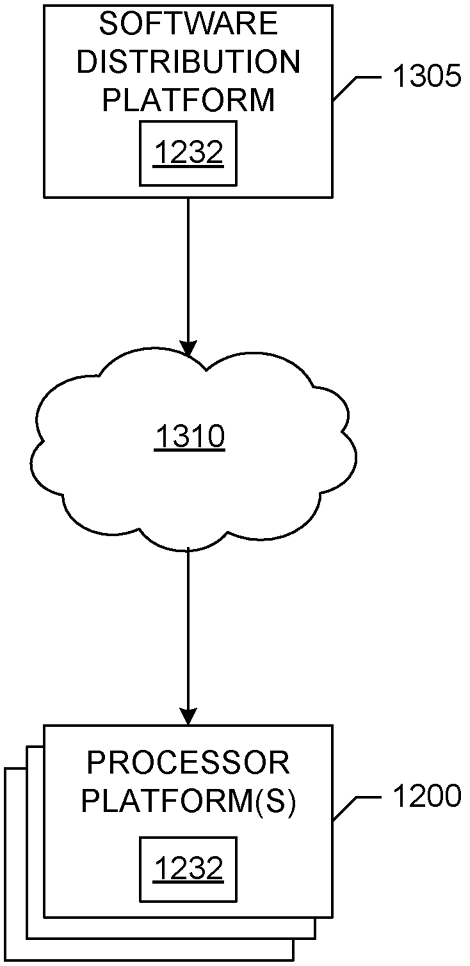
FIG. 13 is a block diagram of an example software distribution platform to distribute software (e.g., software corresponding to the example computer readable instructions of FIGS. 8-11) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers.

A block diagram illustrating an example software distribution platform 1305 to distribute software such as the example computer readable instructions 1232 of FIG. 12 to third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1232 of FIG. 12. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the computer readable instructions 1232, which may correspond to the example computer readable instructions 1232 of FIGS. 8-11, as described above. The one or more servers of the example software distribution platform 1305 are in communication with a network 1310, which may correspond to any one or more of the Internet and/or any of the example networks 106, 1226 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1232 from the software distribution platform 1305. For example, the software, which may correspond to the example computer readable instructions 1232 of FIG. 12, may be downloaded to the example processor platform 1200, which is to execute the computer readable instructions 1232 to implement the meter data analyzer 110. In some example, one or more servers of the software distribution platform 1305 periodically offer, transmit, and/or force updates to the software (e.g., the example computer readable instructions 1232 of FIG. 12) to ensure improvements, patches, updates, etc. are distributed and applied to the software at the end user devices.

From the foregoing, it will be appreciated that example methods, apparatus and articles of manufacture have been disclosed that generate signatures of media based on signature segments corresponding to interrupted exposure data. For example, the methods, apparatus and articles of manufacture disclosed herein determine an overlap of matching signatures between one or more signature segments that do not correspond to the entirety of the media asset. The signature segments are then stitched together to form a signature corresponding to a longer time duration of the media asset. In some examples, the signature segments are analyzed and stitched together if the duration of the signature segment exceeds a threshold. The disclosed methods, apparatus and articles of manufacture improve the efficiency of using a computing device by determining whether signature segments have a time duration exceeding a threshold before analyzing and stitching signatures together. The disclosed methods, apparatus and articles of manufacture are accordingly directed to one or more improvement(s) in the functioning of a computer.

Example methods, apparatus, systems, and articles of manufacture to generate a signature based on signature candidates are disclosed herein. Further examples and combinations thereof include the following:

Example 1 includes an apparatus, comprising a timing handler to determine an alignment point of a first candidate signature segment and a second candidate signature segment, the first candidate signature segment and the second candidate signature segment including time data and signature data, the alignment point based on the time data of the first candidate signature segment and the time data of the second candidate signature segment, a signature comparator to compare a first signature to a second signature at the alignment point, the first signature included in the first candidate signature segment and the second signature included in the second candidate signature segment, and a candidate stitcher to stitch the second signature to the first signature based on the comparison to generate a stitched signature, the stitched signature used for media crediting.

Example 2 includes the apparatus of example 1, further including a candidate checker to determine whether the first candidate signature segment and the second candidate signature segment meet a candidate duration threshold.

Example 3 includes the apparatus of example 2, wherein the candidate checker is to determine the candidate duration threshold based on at least one of validation data or a stitching ability.

Example 4 includes the apparatus of example 1, wherein the signature comparator is to determine a strong match between the first candidate signature segment and the second candidate signature segment in response to a difference between the first signature and the second signature being less than a first deviation threshold.

Example 5 includes the apparatus of example 4, wherein the first deviation threshold is one.

Example 6 includes the apparatus of example 1, further including a signature match counter to count a number of strong matches between the first candidate signature segment and the second candidate signature segment.

Example 7 includes the apparatus of example 6, wherein the signature comparator is to identify a basic match between the first candidate signature segment and the second candidate signature segment in response to the number of strong matches exceeding a first match threshold.

Example 8 includes the apparatus of example 7, wherein the first match threshold is four.

Example 9 includes the apparatus of example 7, wherein the signature comparator is to determine the basic match in response to a difference between the first signature and the second signature being less than a second deviation threshold.

Example 10 includes the apparatus of example 9, wherein the second deviation threshold is two.

Example 11 includes the apparatus of example 6, wherein the signature match counter is to count a number of basic matches between the first candidate signature segment and the second candidate signature segment.

Example 12 includes the apparatus of example 11, wherein the candidate stitcher is to stitch the second candidate signature segment to the first candidate signature segment to generate a stitched signature in response to the number of basic matches exceeding a second match threshold.

Example 13 includes the apparatus of example 12, wherein the second match threshold is 15.

Example 14 includes the apparatus of example 1, wherein the timing handler is to determine a timestamp for the second signature of the stitched signature based on the time data of the signatures of the first candidate.

Example 15 includes at least one non-transitory computer readable medium comprising instructions that, when executed, cause at least one processor to at least determine an alignment point of a first candidate signature segment and a second candidate signature segment, the first candidate signature segment and the second candidate signature segment including time data and signature data, the alignment point based on the time data of the first candidate signature segment and the time data of the second candidate signature segment, compare a first signature to a second signature at the alignment point, the first signature included in the first candidate signature segment and the second signature included in the second candidate signature segment, and stitch the second signature to the first signature based on the comparison to generate a stitched signature, the stitched signature used for media crediting.

Example 16 includes the at least one non-transitory computer readable medium of example 15, wherein the instructions, when executed, cause the at least one processor to determine whether the first candidate signature segment and the second candidate signature segment meet a candidate duration threshold.

Example 17 includes the at least one non-transitory computer readable medium of example 16, wherein the instructions, when executed, cause the at least one processor to determine the candidate duration threshold based on at least one of validation data or a stitching ability.

Example 18 includes the at least one non-transitory computer readable medium of example 15, wherein the instructions, when executed, cause the at least one processor to determine a strong match between the first candidate signature segment and the second candidate signature segment in response to a difference between the first signature and the second signature being less than a first deviation threshold.

Example 19 includes the at least one non-transitory computer readable medium of example 18, wherein the first deviation threshold is one.

Example 20 includes the at least one non-transitory computer readable medium of example 15, wherein the instructions, when executed, cause the at least one processor to count a number of strong matches between the first candidate signature segment and the second candidate signature segment.

Example 21 includes the at least one non-transitory computer readable medium of example 20, wherein the instructions, when executed, cause the at least one processor to identify a basic match between the first candidate signature segment and the second candidate signature segment in response to the number of strong matches exceeding a first match threshold.

Example 22 includes the at least one non-transitory computer readable medium of example 21, wherein the first match threshold is four.

Example 23 includes the at least one non-transitory computer readable medium of example 21, wherein the instructions, when executed, cause the at least one processor to determine the basic match in response to a difference between the first signature and the second signature being less than a second deviation threshold.

Example 24 includes the at least one non-transitory computer readable medium of example 23, wherein the second deviation threshold is two.

Example 25 includes the at least one non-transitory computer readable medium of example 20, wherein the instructions, when executed, cause the at least one processor to count a number of basic matches between the first candidate signature segment and the second candidate signature segment.

Example 26 includes the at least one non-transitory computer readable medium of example 25, wherein the instructions, when executed, cause the at least one processor to stitch the second candidate signature segment to the first candidate signature segment to generate a stitched signature in response to the number of basic matches exceeding a second match threshold.

Example 27 includes the at least one non-transitory computer readable medium of example 26, wherein the second match threshold is 15.

Example 28 includes the at least one non-transitory computer readable medium of example 15, wherein the instructions, when executed, cause the at least one processor to determine a timestamp for the second signature of the stitched signature based on the time data of the signatures of the first candidate.

Example 29 includes a method, comprising determining an alignment point of a first candidate signature segment and a second candidate signature segment, the first candidate signature segment and the second candidate signature segment including time data and signature data, the alignment point based on the time data of the first candidate signature segment and the time data of the second candidate signature segment, comparing a first signature to a second signature at the alignment point, the first signature included in the first candidate signature segment and the second signature included in the second candidate signature segment, and stitching the second signature to the first signature based on the comparison to generate a stitched signature, the stitched signature used for media crediting.

Example 30 includes the method of example 29, further including determining whether the first candidate signature segment and the second candidate signature segment meet a candidate duration threshold.

Example 31 includes the method of example 30, further including determining the candidate duration threshold based on at least one of validation data or a stitching ability.

Example 32 includes the method of example 29, further including determining a strong match between the first candidate signature segment and the second candidate signature segment in response to a difference between the first signature and the second signature being less than a first deviation threshold.

Example 33 includes the method of example 32, wherein the first deviation threshold is one.

Example 34 includes the method of example 29, further including counting a number of strong matches between the first candidate signature segment and the second candidate signature segment.

Example 35 includes the method of example 34, further including identifying a basic match between the first candidate signature segment and the second candidate signature segment in response to the number of strong matches exceeding a first match threshold.

Example 36 includes the method of example 35, wherein the first match threshold is four.

Example 37 includes the method of example 35, further including determining the basic match in response to a difference between the first signature and the second signature being less than a second deviation threshold.

Example 38 includes the method of example 37, wherein the second deviation threshold is two.

Example 39 includes the method of example 34, further including counting a number of basic matches between the first candidate signature segment and the second candidate signature segment.

Example 40 includes the method of example 39, further including stitching the second candidate signature segment to the first candidate signature segment to generate a stitched signature in response to the number of basic matches exceeding a second match threshold.

Example 41 includes the method of example 40, wherein the second match threshold is 15.

Example 42 includes the method of example 29, further including determining a timestamp for the second signature of the stitched signature based on the time data of the signatures of the first candidate.

Example 43 includes an apparatus, comprising at least one storage device, and a processor circuitry to determine an alignment point of a first candidate signature segment and a second candidate signature segment, the first candidate signature segment and the second candidate signature segment including time data and signature data, the alignment point based on the time data of the first candidate signature segment and the time data of the second candidate signature segment, compare a first signature to a second signature at the alignment point, the first signature included in the first candidate signature segment and the second signature included in the second candidate signature segment, and stitch the second signature to the first signature based on the comparison to generate a stitched signature, the stitched signature used for media crediting.

Example 44 includes the apparatus of example 43, wherein the processor circuitry is to determine whether the first candidate signature segment and the second candidate signature segment meet a candidate duration threshold.

Example 45 includes the apparatus of example 44, wherein the processor circuitry is to determine the candidate duration threshold based on at least one of validation data or a stitching ability.

Example 46 includes the apparatus of example 43, wherein the processor circuitry is to determine a strong match between the first candidate signature segment and the second candidate signature segment in response to a difference between the first signature and the second signature being less than a first deviation threshold.

Example 47 includes the apparatus of example 46, wherein the first deviation threshold is one.

Example 48 includes the apparatus of example 43, wherein the processor circuitry is to count a number of strong matches between the first candidate signature segment and the second candidate signature segment.

Example 49 includes the apparatus of example 48, wherein the processor circuitry is to identify a basic match between the first candidate signature segment and the second candidate signature segment in response to the number of strong matches exceeding a first match threshold.

Example 50 includes the apparatus of example 49, wherein the first match threshold is four.

Example 51 includes the apparatus of example 49, wherein the processor circuitry is to determine the basic match in response to a difference between the first signature and the second signature being less than a second deviation threshold.

Example 52 includes the apparatus of example 51, wherein the second deviation threshold is two.

Example 53 includes the apparatus of example 48, wherein the processor circuitry is to count a number of basic matches between the first candidate signature segment and the second candidate signature segment.

Example 54 includes the apparatus of example 53, wherein the processor circuitry is to stitch the second candidate signature segment to the first candidate signature segment to generate a stitched signature in response to the number of basic matches exceeding a second match threshold.

Example 55 includes the apparatus of example 54, wherein the second match threshold is 15.

Example 56 includes the apparatus of example 43, wherein the processor circuitry is to determine a timestamp for the second signature of the stitched signature based on the time data of the signatures of the first candidate.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

The invention claimed is:

1. A computing system comprising a processor and a memory, the computing system configured to perform a set of acts comprising:

obtaining a first signature segment corresponding to a first portion of an episode, the first signature segment including first time data and first signature data;

obtaining a second signature segment corresponding to a second portion of the episode, the second signature segment including second time data and second signature data;

identifying a sequence of time values in the first time data that sequentially matches a sequence of time values in the second time data;

aligning the first signature segment and the second signature segment based on sequence of time values in the first time data and the sequence of time values in the second signature data;

based on the aligning, identifying a sequence of signature values in the first signature data that sequentially matches a sequence of signatures values in the second signature data; and stitching a portion of the first signature segment with a portion of the second signature segment at a stitching point within the sequence of signature values in the first signature data.

2. The computing system of claim 1, wherein the set of acts further comprises determining the stitching point within the sequence of signature values in the first signature data.

3. The computing system of claim 1, wherein identifying the sequence of signature values in the first signature data that sequentially matches the sequence of signature values in the second signature data comprises determining that each signature value of the sequence of signature values in the first signature data is within a threshold of a signature value of the sequence of signature values in the second signature data at a corresponding position within the sequence of signature values in the second signature data.

4. The computing system of claim 1, wherein:

the portion of the first signature segment is a portion of the first signature segment that occurs before the stitching point; and the portion of the second signature segment is a portion of the second signature segment that occurs after the stitching point.

5. The computing system of claim 4, wherein stitching the portion of the first signature segment with the portion of the second signature segment at the stitching point further comprises recalculating the second time data based on the first time data.

6. The computing system of claim 1, wherein the set of acts further comprises storing the stitched combination of the first signature segment and the second signature segment as a reference signature in a reference database.

7. The computing system of claim 6, wherein the set of acts further comprises using the reference signature for media crediting.

8. The computing system of claim 1, wherein the episode is a subscription video on demand (SVOD) asset.

9. A method comprising:

obtaining, by a computing system, a first signature segment corresponding to a first portion of an episode, the first signature segment including first time data and first signature data;

obtaining, by the computing system, a second signature segment corresponding to a second portion of the episode, the second signature segment including second time data and second signature data;

identifying, by the computing system, a sequence of time values in the first time data that sequentially matches a sequence of time values in the second time data;

aligning, by the computing system, the first signature segment and the second signature segment based on sequence of time values in the first time data and the sequence of time values in the second signature data;

based on the aligning, identifying, by the computing system, a sequence of signature values in the first signature data that sequentially matches a sequence of signatures values in the second signature data; and stitching, by the computing system, a portion of the first signature segment with a portion of the second signature segment at a stitching point within the sequence of signature values in the first signature data.

10. The method of claim 9, further comprising determining the stitching point within the sequence of signature values in the first signature data.

11. The method of claim 9, wherein identifying the sequence of signature values in the first signature data that sequentially matches the sequence of signature values in the second signature data comprises determining that each signature value of the sequence of signature values in the first signature data is within a threshold of a signature value of the sequence of signature values in the second signature data at a corresponding position within the sequence of signature values in the second signature data.

12. The method of claim 9, wherein:

the portion of the first signature segment is a portion of the first signature segment that occurs before the stitching point; and the portion of the second signature segment is a portion of the second signature segment that occurs after the stitching point.

13. The method of claim 12, wherein stitching the portion of the first signature segment with the portion of the second signature segment at the stitching point further comprises recalculating the second time data based on the first time data.

14. The method of claim 9, further comprising storing the stitched combination of the first signature segment and the second signature segment as a reference signature in a reference database.

15. The method of claim 14, further comprising using the reference signature for media crediting.

16. The method of claim 9, wherein the episode is a subscription video on demand (SVOD) asset.

17. A non-transitory computer-readable medium having stored therein instructions that when executed by a computing system cause the computing system to perform a set of acts comprising:

obtaining a first signature segment corresponding to a first portion of an episode, the first signature segment including first time data and first signature data;

obtaining a second signature segment corresponding to a second portion of the episode, the second signature segment including second time data and second signature data;

identifying a sequence of time values in the first time data that sequentially matches a sequence of time values in the second time data;

aligning the first signature segment and the second signature segment based on sequence of time values in the first time data and the sequence of time values in the second signature data;

based on the aligning, identifying a sequence of signature values in the first signature data that sequentially matches a sequence of signatures values in the second signature data; and stitching a portion of the first signature segment with a portion of the second signature segment at a stitching point within the sequence of signature values in the first signature data.

18. The non-transitory computer-readable medium of claim 17, wherein the set of acts further comprises determining the stitching point within the sequence of signature values in the first signature data.

19. The non-transitory computer-readable medium of claim 17, wherein identifying the sequence of signature values in the first signature data that sequentially matches the sequence of signature values in the second signature data comprises determining that each signature value of the sequence of signature values in the first signature data is within a threshold of a signature value of the sequence of signature values in the second signature data at a corresponding position within the sequence of signature values in the second signature data.

20. The non-transitory computer-readable medium of claim 17, wherein:

the portion of the first signature segment is a portion of the first signature segment that occurs before the stitching point; and the portion of the second signature segment is a portion of the second signature segment that occurs after the stitching point.

* * * * *